US008961303B2

(12) United States Patent
Sawano et al.

(10) Patent No.: US 8,961,303 B2
(45) Date of Patent: *Feb. 24, 2015

(54) GAME APPARATUS AND GAME PROGRAM

(71) Applicant: Nintendo Co., Ltd., Kyoto (JP)

(72) Inventors: Takao Sawano, Kyoto (JP); Tatsuhiro Shirai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/937,045

(22) Filed: Jul. 8, 2013

(65) Prior Publication Data

US 2013/0296054 A1  Nov. 7, 2013

Related U.S. Application Data

(63) Continuation of application No. 11/011,492, filed on Dec. 15, 2004, now Pat. No. 8,500,552.

(30) Foreign Application Priority Data

Dec. 26, 2003  (JP) ................................. 2003-432968

(51) Int. Cl.
A63F 9/24 (2006.01)
(52) U.S. Cl.
USPC ............................................. 463/30; 463/16

(58) Field of Classification Search
USPC ...................................................... 463/16–42
See application file for complete search history.

(56) References Cited

U.S. PATENT DOCUMENTS

| 5,470,080 | A | 11/1995 | Naka et al. |
| 6,652,378 | B2 | 11/2003 | Cannon et al. |
| 2003/0125101 | A1 | 7/2003 | Campo |
| 2004/0014525 | A1 | 1/2004 | Suganuma |
| 2005/0020341 | A1 | 1/2005 | Brosnan |
| 2005/0026670 | A1 | 2/2005 | Lardie |
| 2005/0202868 | A1 | 9/2005 | Sawano et al. |

FOREIGN PATENT DOCUMENTS

| JP | 10-071274 | 3/1998 |
| JP | 2001-299975 | 10/2001 |
| JP | 2002-028369 | 1/2002 |

*Primary Examiner* — Masud Ahmed
(74) *Attorney, Agent, or Firm* — Nixon & Vanderhye, P.C.

(57) ABSTRACT

A game apparatus includes operation means operated by a player, selection means, player object action control means, display control means, and evaluation means. The game apparatus displays a first game image and a second game image concurrently. The player selects either one of the first game image and the second game image with the selection means. The player further operates the operation means to operate a player object related to the selected game image.

23 Claims, 15 Drawing Sheets

GAME APPARATUS AND GAME PROGRAM

This application is a continuation application of U.S. application Ser. No. 11/011,492 filed Dec. 15 2004, which claims the benefit of Japanese Patent Applications No. 2003-432968 is incorporated herein by reference.

FIELD OF THE INVENTION

The illustrative embodiments relate to a game apparatus and a game program, and, more specifically, to a game apparatus and a game program in which a game is executed while switching between two game images.

BACKGROUND AND SUMMARY OF THE INVENTION

Conventionally, game devices which allow two game images to be displayed concurrently are known. For example, Japanese Laid-Open Patent Publication No. 2002-28369 (document 1) discloses a mah-jongg game apparatus which allows game images of one mah-jongg table, as seen from a plurality of viewpoints, to be displayed concurrently. For example, FIG. 3 of document 1 shows a game image of discarded tiles as seen obliquely from above and a game image thereof as seen from the held tile side. Thus one can play a game as if he or she were playing an actual game, and it is possible to simultaneously look at one's self and an opponent in the same game. In addition, dramatic quality is supposed to be improved.

Japanese Laid-Open Patent Publication No. 2001-299975 (document 2) discloses a game apparatus which allows a video image showing how a player is dancing and a dancing character image serving as a teaching model to be displayed concurrently. As disclosed in FIG. 1 of document 2, the video image showing the player dancing is displayed on a first split screen of a principal screen of a monitor device, whereas a three-dimensional image of the character serving as a teaching model is displayed on a second split screen of the principal screen. This is supposed to make it possible to learn to dance in a short time because one can dance a dance while comparing his or her pose or step with a 3D image serving as a teaching model.

Further, Japanese Laid-Open Patent Publication No. 10-71274 (document 3) discloses a baseball game apparatus which allows an offence-side game image and a defense-side game image to be displayed concurrently in a competitive baseball game played by a plurality of players. FIG. 6 of document 3 discloses an exemplary case where a game screen is split into two parts, left and right, and an offense-side image is displayed on the left side, whereas a defense-side image is displayed on the right side. This is supposed to make it easier for a game player to intuitively grasp an operation to be performed next.

However, the game apparatus disclosed in the above-described document 1 only enhances the stage effect or makes it easier to recognize a game situation by concurrently displaying a plurality of game images as seen from different viewpoints. The game apparatus disclosed in document 2 only provides assistance for game play by displaying a teaching model image for dancing. Further, the game apparatus disclosed in document 3 only concurrently displays game images for respective players in a multi-player game.

As described above, some conventional game apparatuses display a plurality of game images concurrently; however, they only enhance the stage effect, provide an assistance for game play, or concurrently display game images for respective players.

Therefore, a feature of the illustrative embodiments is to provide a game apparatus and a game program which effectively use two game images concurrently displayed to enhance game quality.

The illustrative embodiments have the following aspects to resolve the problem mentioned above. It should be noted that reference numerals and supplemental remarks in parentheses merely indicate correspondence with embodiments which will be described further below for the purpose of better understanding of the illustrative embodiments, and do not restrict the present invention in any manner.

A first aspect of the illustrative embodiments is directed to a game apparatus (10) allowing a first game image (FIG. 3A, FIG. 7A) and a second game image (FIG. 3B, FIG. 7B) to be displayed concurrently. The first game image and the second game image are different game images from each other. This game apparatus includes selection means (15d, steps S102, S104, step S202, and S204), first action control means (190b, S110, S114, 210a, S210) for controlling an action of a first player object (200a, player character A), second action control means (190b, S112, S116, 210a, S212) for controlling an action of a second player object (200b, player character B), evaluation means (190c, S120, S122, 210c, S216 to S226), first display control means (190e, S124, 210e, S228) for generating and displaying the first game image, and second display control means (190e, S124, 210e, S230) for generating and displaying the second game image. The player object is an object operated by the player. The selection means selects either one of the first game image and the second game image. The first action control means controls the action of the first player object, associated with the first game image, in accordance with operation by the player, only when the first game image is being selected by the selection means. The second action control means controls the action of the second player object, different from the first player object, associated with the second game image, in accordance with operation by the player, only when the second game image is being selected by the selection means. The evaluation means evaluates a result of the action of the first player object caused by the first action control means, evaluates a result of the action of the second player object caused by the second action control means, and conducts game evaluation for the player based on both evaluations. The first display control means generates and displays, as the first game image, an image including at least the first player object. Alternatively, the first display control means generates and displays, as the first game image, an image of a virtual space as seen from a viewpoint of the first player object. The second display control means generates and displays, as the second game image, an image including at least the second player object. Alternatively, the second display control means generates and displays, as the second game image, an image of a virtual space as seen from a viewpoint of the second player object.

Further, in a second aspect, the selection means selects either one of the first game image and the second game image in accordance with input of the player.

Furthermore, in a third aspect, the selection means automatically selects either one of the first game image and the second game image in accordance with a situation in a progress of a game (S202').

Further still, in a fourth aspect, the first action control means and the second action control means share operation means (15a) to control the action of the first player object and the action of the second player object, respectively.

Further still, in a fifth aspect, first automatic control means (190*a*, S118) is further included for, regardless of selection by the selection means, controlling the actions of the first player object and the second player object based on a predetermined rule (regardless of operation of the operation means), in addition to control thereof by the first action control means and the second action control means. The evaluation means evaluates both a result of the action of the first player object caused by the first action control means and the first automatic control means and a result of the action of the second player object caused by the second action control means and the first automatic control means.

Further still, in a sixth aspect, third action control means (210*b*, S214) and condition change means (210*c*, S216, S218, S222, S224) are further included. The third action control means controls, regardless of selection by the selection means, an action of a non-player object (enemy character A, B, C) based on a predetermined rule (regardless of operation of the operation means). In accordance with the action of the non-player object caused by the third action control means, the condition change means changes conditions (conditions of attribute data such as power values) of the first player object and the second player object. The evaluation means evaluates both the condition of the first player object and the condition of the second player object changed by the condition change means. The non-player object is an object not operable by the player and controlled by a computer based on a game program.

Further still, in a seventh aspect, the first action control means controls the action of the first player object in accordance with the operation of the operation means only when a predetermined condition (a vehicle character 200 being located outside a dotted line 202) is satisfied.

Further still, in an eighth aspect, the first game image shows the player whether the predetermined condition is satisfied or not in a visually recognizable manner (the dotted line 202 is displayed so as to be superposed on the game image).

Further still, in a ninth aspect, a selection switch (15*d*) is further included. When an operation is performed on the selection switch, the selection means switches selection between the first game image and the second game image in an alternate manner (S102, S104, S202, S204).

Further still, in a tenth aspect, display mode change means (190*d*, S104, 210*d*, S204) is further included for changing the display mode of the first game image, depending on whether it is selected by the selection means or not, and for changing the display mode of the second game image, depending on whether it is selected or not by the selection means.

Further still, in an eleventh aspect, a first display section (LCD 11) and a second display section (LCD 12) are included. An image being selected by the selection means from among the first game image and the second game image is displayed on the first display section, whereas an image not being selected is displayed on the second display section.

Further still, in a twelfth aspect, second automatic control means (S2151 to S2153) is further included for controlling, according to a predetermined rule, the action of a player object associated with the game image not being selected by the selection means, from among the first player object and the second player object.

Further still, a thirteenth aspect is directed to a storage medium having stored therein a game program executed by a computer of the game apparatus allowing the first game image and the second game image to be displayed concurrently. The first game image and the second game image are game images different from each other. This game program causes the game apparatus to function as the selection means, the first action control means for controlling the action of the first player object, the second action control means for controlling the action of the second player object, the evaluation means, the first display control means for generating and displaying the first game image, and the second display control means for generating and displaying the second game image. The selection means selects either one of the first game image and the second game image. The first action control means controls the action of the first player object associated with the first game image in accordance with operation by the player, only when the first game image is being selected by the selection means. The second action control means controls the action of the second player object, different from the first player object, associated with the second game image in accordance with operation by the player, only when the second game image is being selected by the selection means. The evaluation means evaluates a result of the action of the first player object caused by the first action control means, evaluates a result of the action of the second player object caused by the second action control means, and conducts game evaluation for the player based on both evaluations. The first display control means generates and displays, as the first game image, an image including at least the first player object. Alternatively, the first display control means generates and displays, as the first game image, an image of a virtual space as seen from a viewpoint of the first player object. The second display control means generates and displays, as the second game image, an image including at least the second player object. Alternatively, the second display control means generates and displays, as the second game image, an image of a virtual space as seen from a viewpoint of the second player object.

According to the first aspect, the player needs to operate a plurality of player objects and play a game while paying attention to both the first game image and the second game image; therefore, complexity of the game is improved, resulting in improved enjoyment.

According to the second aspect, the player needs to play the game while appropriately judging which player object should be operated by comparing the game images, paying attention to both the first game image and the second game image; therefore, game quality is high.

According to the third aspect, an intention of a game developer can be reflected in the game, such as which player object he or she desires the player to operate in accordance with the situation in the progress of the game. Thus, the game progression is made diversified, e.g., in a certain situation, the player is forcibly made to operate the first player object, and in another situation, the player is made to operate the second player object.

According to the fourth aspect, whether the first game image is selected or whether the second game image is selected, operation is performed by the same operation means; therefore, shifting can be performed smoothly because there is no need to switch operation means when switching the selection of the game images.

According to the fifth aspect, even while the player is selecting the first game image and operating the action of the first player object, the action of the second player object is controlled by the first automatic control means, and the condition of the second player object is being changed. If the player does not pay attention to the second game image, paying attention only to the first game image, the second player object may meanwhile fall into an unfavorable condition, resulting in a low game evaluation being made by the evaluation means. Conversely, even while the player is selecting the second game image and operating the action of the second player object, the action of the first player object is controlled by the first automatic control means, and the condition of the first player object is being changed. If the player does not pay attention to the first game image, paying attention only to the second game image, the first player object may meanwhile fall into an unfavorable condition, resulting in a low game evaluation being made by the evaluation means. That is, in order to receive a high game evaluation, it is necessary to pay attention both to the first game image and the second game image and compare the condition of the first player object and the condition of the second player object comprehensible from both images, thereby appropriately selecting and controlling the first game image or the second game image.

According to the sixth aspect, even while the player is selecting the first game image and operating the first player object, the action of the non-player object is controlled by the third action control means, and the situation between the second player object and the non-player object is being changed. If the player does not pay attention to the second game image, paying attention only to the first game image, the situation between the second player object and the non-player object may meanwhile fall into an unfavorable condition, resulting in a low game evaluation being made by the evaluation means. Conversely, even while the player is selecting the second game image and operating the second player object, the action of the non-player object is controlled by the third action control means, and the situation between the first player object and the non-player object is being changed. If the player does not pay attention to the first game image, paying attention only to the second game image, the situation between the first player object and the non-player object may meanwhile fall into an unfavorable condition, resulting in a low game evaluation being made by the evaluation means. That is, in order to receive a high game evaluation, it is necessary to pay attention to both the first game image and the second game image and compare the condition of the first player object and the condition of the second player object comprehensible from both images, thereby appropriately selecting and controlling the first player object or the second player object.

According to the seventh aspect, the action of the first player object is made controllable with the operation of the operation means only when the predetermined condition is satisfied; therefore, the player sometimes cannot operate the first player object, which improves complexity of the game, resulting in enhanced enjoyment. For example, even if the player, viewing the first game image, wishes to change the condition of the first player object when selecting the second game image and operating the second player object, he or she cannot operate the first player object if the predetermined condition is not satisfied. The player can do nothing but operate the second player object, even though the player may wish to operate the first player object, which will distract the player and even make the operation of the second player object a difficult task. In the meantime, the condition of the first player object is changing, requiring the player to continue game play in a more distracted state. Thus, the difficulty of the game is improved, resulting in enhanced enjoyment.

According to the eighth aspect, judgment about whether the predetermined condition is satisfied or not can be made only by viewing the first game image, which requires the game to be played without attention being diverted from the first game image. Thus, the difficulty of the game is improved, resulting in enhanced enjoyment.

According to the ninth aspect, since the selection is switched in an alternate manner by the operation of the selection switch, both switching from the first game image to the second game image and switching from the second game image to the first game image can be performed by the same operation. Thus the switching operation can be performed easily and smoothly.

According to the tenth aspect, the display mode is changed depending on the presence or absence of selection. Thus, the player is able to know which game image is currently selected.

According to the eleventh aspect, the image associated with an operable player character is always displayed on the first display section, which allows the player to primarily view only the first display section. Thus, the screen to be primarily viewed is made fixed, making play easier. Even in this case, however, the play requires the player to pay attention to the image on the second display section. Therefore, the same effect as that of the first aspect is achieved.

According to the twelfth aspect, since the player object associated with the image not being selected is automatically controlled, an unnatural situation, i.e., lack of action of the player object which is currently not operable, can be prevented from occurring. In addition, the action of the player object is sometimes left under automatic control and other times operated by the player at will, whereby diversification of the game progress is achieved.

According to the thirteenth aspect, the same effect as that of the first aspect is achieved.

These and other features and aspects of the illustrative embodiments will become more apparent from the following detailed description when taken in conjunction with the accompanying drawings.

DESCRIPTION OF THE PREFERRED EMBODIMENTS

Figure 1:
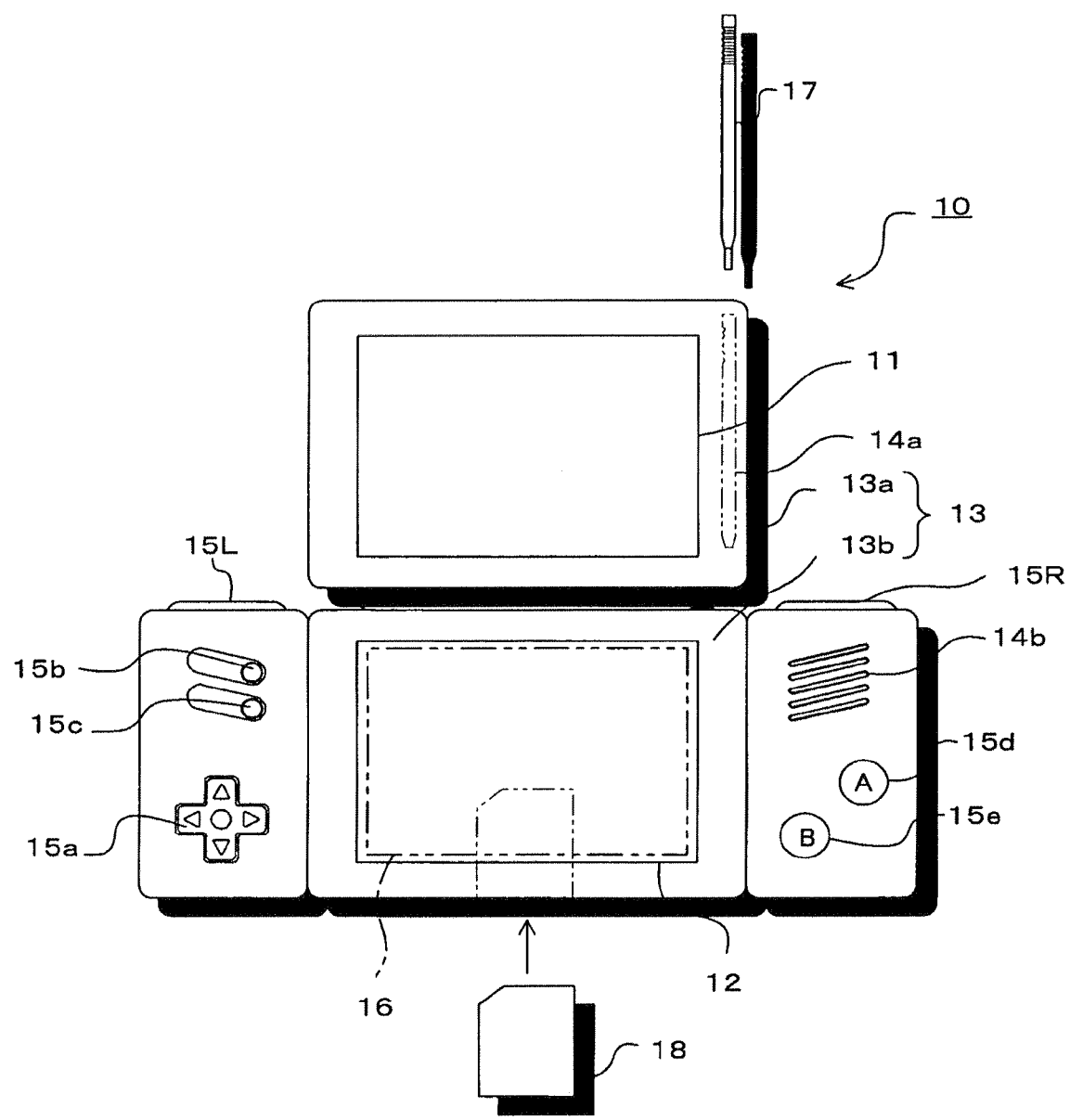
FIG. 1 is an external view of a game apparatus 10 according to an illustrative embodiment.

FIG. 1 is an external view of a hand-held game apparatus according to an aspect of the illustrative embodiments. In FIG. 1, the hand-held game apparatus 10 according to this embodiment is structured such that two liquid crystal displays (LCDs) 11 and 12 are accommodated in a housing 13 so as to establish a predetermined positional relationship therebetween. Specifically, in the case where a first liquid crystal display (hereinafter referred to as an "LCD") 11 and a second LCD 12 are accommodated therein so as to be arranged one above the other, the housing 13 is composed of an upper housing 13a and a lower housing 13b, and the upper housing 13a is supported on a part of the upper side of the lower housing 13b so as to be freely rotatable. The upper housing 13a has a planar shape slightly larger than a planar shape of the first LCD 11, and an opening is formed therein so that a display surface of the LCD 11 becomes uncovered on a principal surface thereof. The lower housing 13b is arranged to have a planar shape wider than that of the upper housing 13a, and an opening is formed therein substantially in its center in the horizontal direction to make a display surface of the LCD 12 uncovered. In addition, a sound emission hole 14b is formed on one side of the LCD 12, and an operation switch section 15 is provided on both sides of the LCD 12.

The operation switch section 15 includes a direction instruction switch 15a, a start switch 15b, and a select switch 15c, which are provided at the left of the LCD 12 on the principal surface of the lower housing 13b, and action switches 15d and 15e, which are provided at the right of the LCD 12 on the principal surface of the lower housing 13b. The direction instruction switch 15a is used, for example, to give an instruction as to a moving direction of a player object (or a player character), operable by a player, or to give an instruction as to a moving direction of a cursor. The action switches 15d and 15e are used for an action other than directional instruction, e.g., for inputting instructions to jump, to punch, to move a weapon, and so on in the case of an action game, or inputting instructions to obtain an item, to decide to select a weapon or a command, and so on in the case of a role-playing game (RPG) or a simulation RPG. If necessary, an additional action switch may be provided, or side switches 15L and 15R may be provided on a surface (i.e., an upper side surface) above an area where the operation switch 15 is provided in the lower housing 13b.

In addition, a touch panel 16 may be provided on the LCD 12. The touch panel 16 may be, for example, of any of the following types: a resistive-film type, an optical type (an infrared type), and a capacitive coupling type. The touch panel 16 detects a coordinate location of a stick 17 (or a finger) and outputs coordinate data when a pressing operation, a moving operation, or a stroking operation is performed on its surface with the stick 17.

The upper housing 13a has a storage hole 14a formed in the vicinity of a side surface thereof for storing the stick 17 with which to perform an operation on the touch panel 16 as necessary. The stick 17 is stored in the storage hole 14a. The lower housing 13b has a cartridge insertion potion (not shown) formed at a part of a side surface thereof for inserting, in a detachable manner, a memory card 18 containing a memory (e.g., a ROM) having a game program stored therein. The cartridge insertion potion has inside it a connector (not shown) with which to achieve electrical connection with the memory card 18. Further, the lower housing 13b (or the upper housing 13a) contains an electronic circuit board (30 shown in FIG. 2 described below) having mounted thereon various electronic parts such as a CPU and the like. Note that the information storage medium for storing the game program is not limited to a nonvolatile semiconductor memory such as a ROM or a flash memory, but may be a CD-ROM, a DVD, or any other similar optical disk type storage medium.

Figure 2:
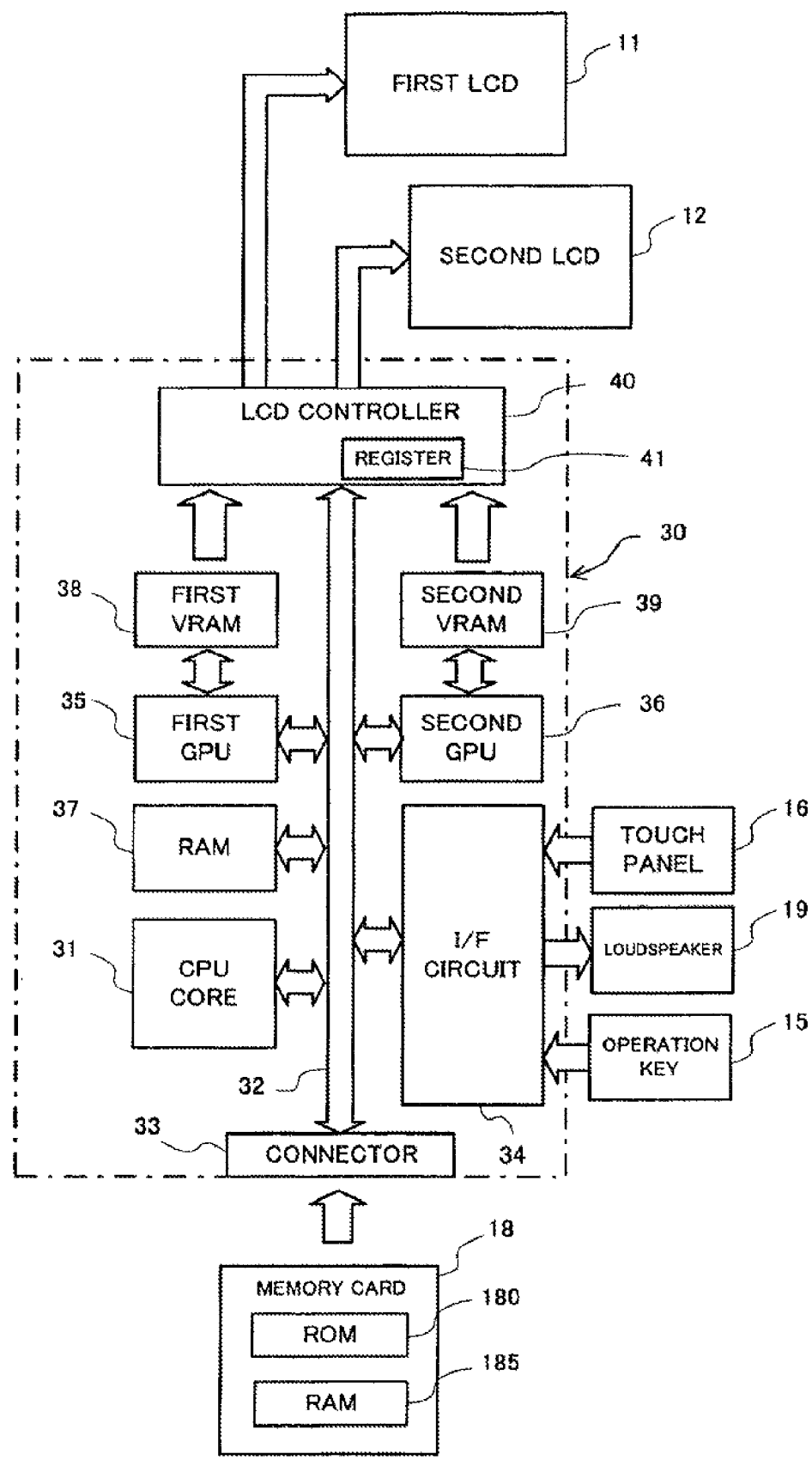
FIG. 2 is a functional block diagram of the game apparatus 10.

FIG. 2 is a block diagram of the hand-held game apparatus 10. In FIG. 2, the electronic circuit board 30 contained in the housing 13 has a CPU core 31 mounted thereon. To the CPU core 31 is connected via a bus 32 a connector 33 as well as an input/output interface (I/F) circuit 34, a first graphics processing unit (a first GPU) 35, a second graphics processing unit (a second GPU) 36, a RAM 37, and an LCD controller 40. The memory card 18 is connected to the connector 33 in a detachable manner. The memory card 18 is a storage medium for storing the game program and, specifically, contains a ROM 180 for storing the game program and a RAM 185 for storing backup data in a rewritable manner. The game program stored in the ROM 180 in the memory card 18 is loaded into the RAM 37, and the game program loaded in the RAM 37 is executed by the CPU core 31. Temporary data obtained as a result of execution by the CPU core 31 of the game program or data for generating an image is stored in the RAM 37. To the I/F circuit 34 are connected an operation key switch section 15 and the touch panel 16 as well as a loudspeaker 19. The loudspeaker 19 is placed at a position inside the sound emission hole 14b.

The first GPU 35 is connected to a first video RAM (hereinafter referred to as "VRAM") 38, and the second GPU 36 is connected to a second video RAM (hereinafter referred to as "VRAM") 39. In response to an instruction from the CPU core 31, the first GPU 35 generates a first game image based on data for generating an image stored in the RAM 37 and renders it on the first VRAM 38. In response to an instruction from the CPU core 31, the second GPU 36 generates a second game image based on data for generating an image stored in the RAM 37 and renders it on the second VRAM 39. The first VRAM 38 and the second VRAM 39 are connected to the LCD controller 40.

The LCD controller 40 includes a register 41. In response to an instruction from the CPU core 31, the register 41 stores a value, 0 or 1. If the value in the register 41 is 0, the LCD controller 40 outputs the game image rendered on the first VRAM 38 to the LCD 11 and outputs the game image rendered on the second VRAM 39 to the LCD 12. If the value in the register 41 is 1, it outputs the game image rendered on the first VRAM 38 to the LCD 12 and outputs the game image rendered on the second VRAM 39 to the LCD 11.

The I/F circuit 34 is a circuit for exchanging data between the CPU core 31 and an external input/output unit such as the operation key 15, the touch panel 16, the loudspeaker 19, etc. The touch panel 16 (including a device driver for the touch panel) has a coordinate system corresponding to a coordinate system of the second VRAM 24 and outputs data of location coordinates corresponding to a location inputted (i.e., specified) by the stick 17. The embodiments below describe the case where a display screen has a resolution of 256 dot×192 dot and the touch panel 16 has a detection precision of 256 dot×192 dot so as to correspond with the display screen. However, the detection precision of the touch panel 16 may be lower or higher than the resolution of the display screen.

First Embodiment

Figure 3A:
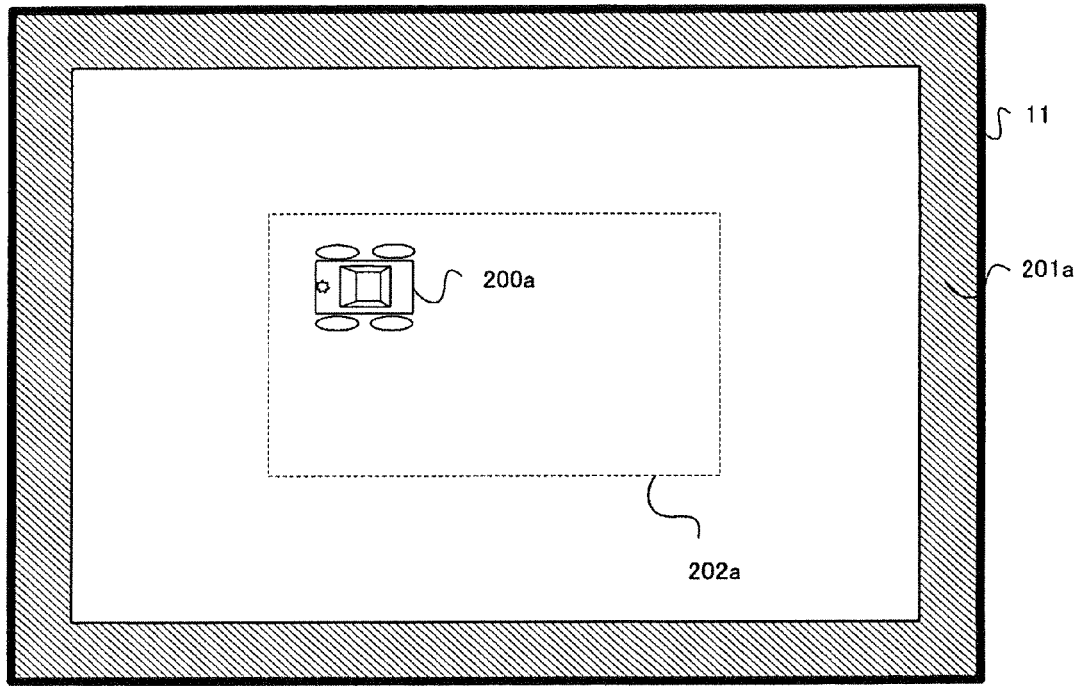
FIG. 3A and FIG. 3B are diagrams each illustrating an exemplary game image on a screen in a first embodiment of the present invention.

FIGS. 3A through 6 are drawings for explaining a first illustrative embodiment. First, with reference to FIG. 3A and FIG. 3B, an outline of a game of the first embodiment is described. FIG. 3A shows an exemplary game image displayed on the LCD 11, and FIG. 3B shows an exemplary game image displayed on the LCD 12.

In the game of the present embodiment, a vehicle character 200a is displayed on the LCD 11, and another vehicle character 200b is displayed on the LCD 12. In addition, a wall character 201a is displayed along the four edges of the LCD 11, and a wall character 201b is displayed along the four edges of the LCD 12. The vehicle character 200a moves inside the wall character 201a, and the vehicle character 200b moves inside the wall character 201b.

The player operates the direction instruction switch 15a to change the moving direction of the vehicle character 200a and the vehicle character 200b. Specifically, if the direction instruction switch 15a is operated to the left, the moving direction of the vehicle character is made to turn by a predetermined angle to the left, on the basis of a current moving direction, and if the direction instruction switch 15a is operated to the right, the moving direction of the vehicle character is made to turn by a predetermined angle to the right, on the basis of a current moving direction.

Even while no operation is being performed by the player, the display is altered such that the vehicle character 200a and the vehicle character 200b appear to be moving, according to a predetermined algorithm based on the game program. Specifically, even when no operation is being performed by the player, the vehicle character 200a and the vehicle character 200b are moving forward in the current moving direction at a fixed speed. Therefore, if the player does not operate the vehicle character, the vehicle character automatically moves forward to collide against the wall character. If the vehicle character 200a collides against the wall character 201a, the game is over. Also, if the vehicle character 200b collides against the wall character 201b, the game is over as well. As such, the player has to manipulate the direction instruction switch 15a to change the moving direction of the vehicle character 200a and the vehicle character 200b so that both the collision of the vehicle character 200a against the wall character 201a and the collision of the vehicle character 200b against the wall character 201b will be avoided.

However, the player cannot operate both the vehicle character 200a and the vehicle character 200b simultaneously, as he or she is capable of operating only one of the two at a time.

Figure 3B:
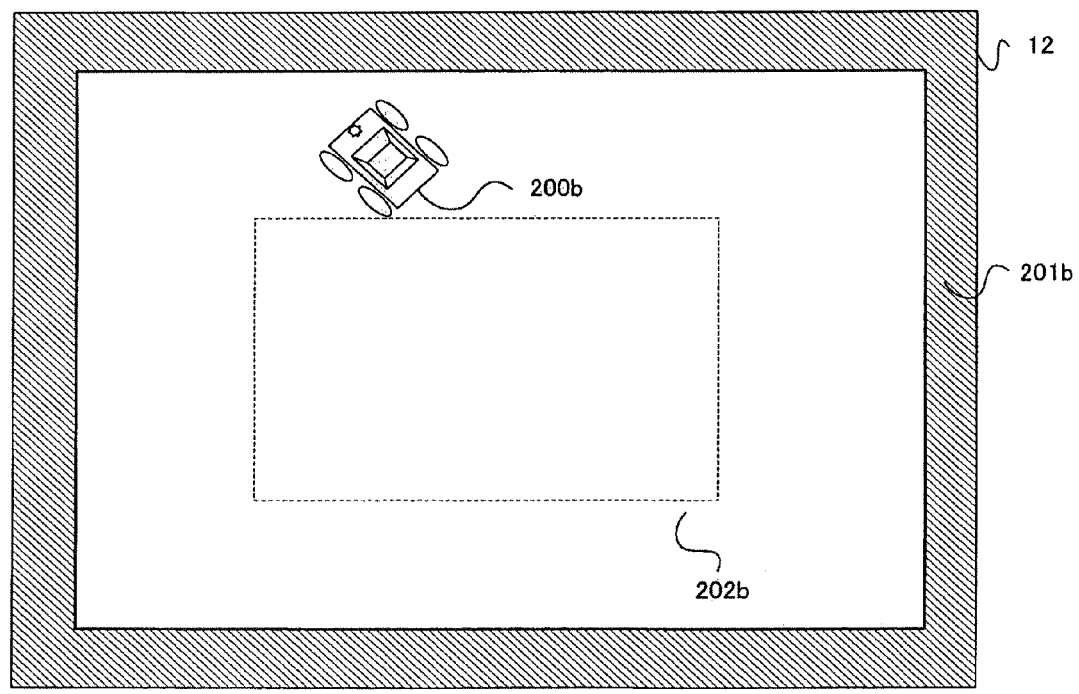

The player is able to select either the game image on the LCD 11 or the game image on the LCD 12. Specifically, for example, the game image on the LCD 11 is selected in an initial state (i.e., a state at the game start), and every time the player presses the action switch 15d, the selection is switched in the following manner: the image on the LCD 11→ the image on the LCD 12→ the image on the LCD 11→ the image on the LCD 12→ the image on the LCD 11. A game image currently selected is displayed in color, and a game image not selected is displayed in black and white. For example, in the state as shown in FIG. 3A and FIG. 3B, the image on the LCD 11 is selected so that it is in color whereas the image on the LCD 12 is not selected so it is in black and white. Subjecting the game image not selected to a predetermined image processing (i.e., changing the display mode of the game image not selected) as described above makes it possible for the player to clearly and easily know which image is currently selected. As in the present embodiment, if the display mode of the image not selected is caused to change whereas the game image currently selected remains in a normal state, no problem occurs with game play. In addition, if it is so arranged that the game image will be in black and white when it is not selected, color information will likely be lost. However, this does not involve making the game image invisible, so there is an advantage in that it is easy to recognize a game situation. As another example of changing the display mode, the brightness of the game image not selected may be decreased. Also, a sign indicating selection may be displayed in the selected game image, conversely.

If the player operates the direction instruction switch 15a, the moving direction of the vehicle character included in the currently selected game image is made to change in accordance with that operation (the moving direction of the vehicle character included in the unselected game image is not changed). For example, in the case where the image on the LCD 11 is selected, if the player operates the direction instruction switch 15a, the moving direction of the vehicle character 200a is made to change in accordance with that operation. Conversely, in the case where the image on the LCD 12 is selected, if the player operates the direction instruction switch 15a, the moving direction of the vehicle character 200b is made to change in accordance with that operation. In the present embodiment, when the player operates a switch, the vehicle character 200a and the vehicle character 200b act in the same manner. However, in another embodiment, when the player operates a switch, the vehicle characters 200a and 200b may act in mutually different manners. In other words, the association of operations by the player, with the actions of the vehicle character corresponding to the respective operations, may differ from one vehicle character to another.

If the player concentrates on the LCD 11 and operates only the vehicle character 200a, the vehicle character 200b may meanwhile collide against the wall character 201b, resulting in a game over. Conversely, if the player concentrates on the LCD 12 and operates only the vehicle character 200b, the vehicle character 200a may meanwhile collide against the wall character 201a, resulting in a game over. As such, the player has to pay attention to both the game image on the LCD 11 and the game image on the LCD 12. The player must also compare the situation represented by the game image on the LCD 11 with the situation represented by the game image on the LCD 12 to determine the situation of which game image should be changed. Finally, the player must operate the action switch 15d to switch the selection between the game images, then change the situation of the selected game image.

Specifically, if the vehicle character 200a comes close to colliding against the wall in the image on the LCD 11, the image on the LCD 11 should be selected to change the moving direction of the vehicle character 200a by operating the direction instruction switch 15a, thereby preventing the collision to the wall character 201a. If the vehicle character 200b comes close to colliding against the wall in the image on the LCD 12, the image on the LCD 12 should be selected to change the moving direction of the vehicle character 200b by operating the direction instruction switch 15a, thereby preventing the collision to the wall character 201b.

Further, in the game of the present embodiment, even when the image on the LCD 11 is selected, the player cannot operate the vehicle character 200a at a certain time. Also, even when the image on the LCD 12 is selected, he or she cannot operate the vehicle character 200b at a certain time. Specifically, in FIG. 3A, when the vehicle character 200a is located inside of an area enclosed by a dotted line 202a, the player cannot operate the vehicle character 200a even if the image on the LCD 11 is being selected (i.e., the moving direction of the vehicle character 200a is not changed even if the direction instruction switch 15a is operated). Also, in FIG. 3B, when the vehicle character 200b is located inside of an area enclosed by a dotted line 202b, the player cannot operate the vehicle character 200b even if the image on the LCD 12 is being selected (i.e., the moving direction of the vehicle character 200b is not changed even if the direction instruction switch 15a is operated). That is, while the vehicle character is located close to the center of the image, player operation is impossible. It is not until it has approached the wall character to some degree that player operation becomes possible. This makes it possible to provide a thrilling game. By changing the size of the dotted lines 202a and 202b, the difficulty of this game can be changed.

Figure 4:
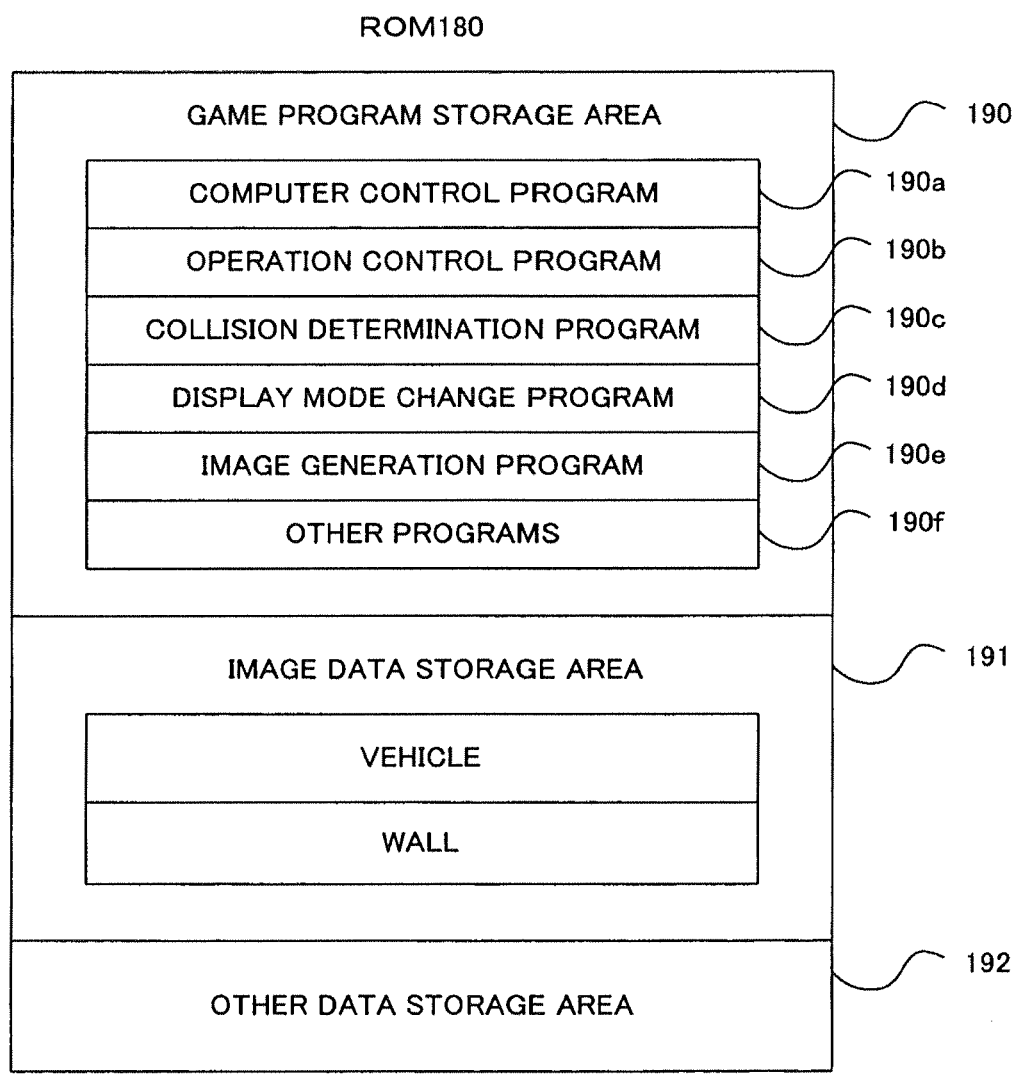
FIG. 4 is an illustrative diagram of programs and data stored in a ROM 180 in the first embodiment.

FIG. 4 shows game programs and data stored in the ROM 180 of the game apparatus 10 according to the present embodiment. When executing the game of the present embodiment, these programs and data are loaded into the RAM 37 and processed by the CPU core 31.

In the ROM 180, a game program storage area 190, an image data storage area 191, and an other data storage area 192 are formed.

In the game program storage area 190, data of various programs executed by the CPU core 31 are stored. Specifically, a computer control program 190a, an operation control program 190b, a collision determination program 190c, a display mode change program 190d, an image generation program 190e, and other programs 190f are stored. The computer control program 190a is a program for causing the vehicle characters 200a and 200b to move according to a predetermined algorithm even when there is no operation by the player (operation of the direction instruction switch 15a). Specifically, in the present embodiment, the algorithm simply allows them to move forward in a current moving direction, but it may be arranged that control for random movement is performed, or the movement may be controlled by another algorithm having regularity. The operation control program 190b is a program for changing the moving direction of the vehicle characters 200a and 200b in accordance with an operation by the player of the direction instruction switch 15a. The collision determination program 190c is a program for determining that the vehicle character 200a has collided against the wall character 201a, and that the vehicle character 200b has collided against the wall character 201b. The display mode change program 190d is a program for changing the display mode of the game image displayed on the LCD, based on whether it is selected or not. In the present embodiment, while a game image is selected, it is in color, and while not selected, it is in black and white. As another example, some kind of sign (e.g., a sign representing the operation key) may be displayed in a corner of the image selected, or alternatively an edge region of the image selected may, for example, be colored so that the player will be informed whether it is selected or not. The image generation program 190e is a program for generating game images, including the vehicle character and the wall character, which may be operated by the computer control program 190a and the operation control program 190b. The other programs 190f are various programs necessary for the game processing, which include a menu program, a program for initial setting, a program for the game over point, a sound program, and the like.

In the image data storage area 191, various image data for displaying a game image is stored. Specifically, image data of the vehicle characters 200a and 200b and image data of the wall characters 201a and 201b is stored therein. Also, although not shown in the figure, image data of the dotted line 202 is stored. In the present embodiment, the same image data is used for the vehicle characters 200a and 200b and for the wall characters 201a and 201b, respectively. However, different suitable image data maybe used.

In the other data storage area 192, other various data necessary for the game processing is stored, e.g., data for initial setting, sound data, etc.

Figure 5:
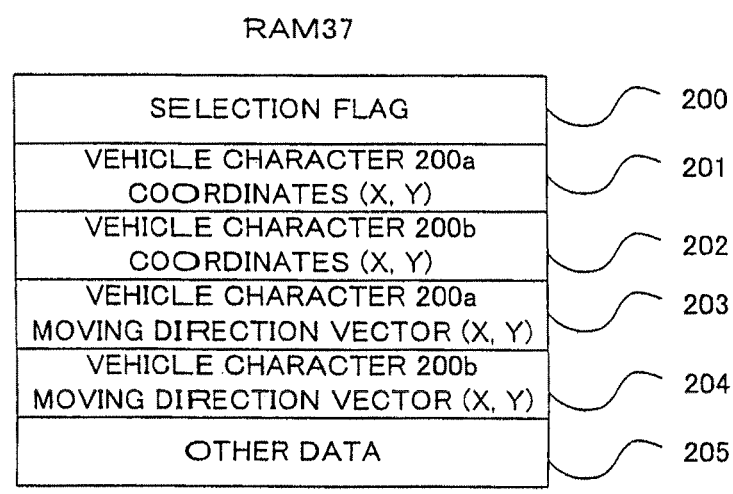
FIG. 5 is an illustrative diagram of data temporarily stored in a RAM 37 while the game processing is being performed in the first embodiment.

FIG. 5 shows data temporarily stored in the RAM 37 while the game of the present embodiment is executed. In the RAM 37, a selection flag 200, vehicle character coordinate data 201 and 202, vehicle character moving direction vectors 203 and 204, and other data 205 are stored. The selection flag 200 is data indicating whether the image on the LCD 11 is currently selected or whether the image on the LCD 12 is currently selected. For example, when the image on the LCD 11 is selected, the selection flag 200 indicates 0, whereas when the image on the LCD 12 is selected, the selection flag 200 indicates 1. The vehicle character coordinate data 201 is data representing a position on the LCD 11 of the vehicle character 200a, and the vehicle character coordinate data 202 is data representing a position on the LCD 12 of the vehicle character 200b. The vehicle character moving direction vector 203 is vector data representing a current moving direction of the vehicle character 200a, and the vehicle character moving direction vector 204 is vector data representing a current moving direction of the vehicle character 200b. These data (201 to 204) are changed when the vehicle character is subjected to operation control by the computer control program 190a or the operation control program 190b. The image generation program 190e generates game images based on these data. The other data 205, score data and the like are stored as necessary.

In addition to these data, program data as shown in FIG. 4 is read from the ROM 180 and stored in the RAM.

Figure 6:
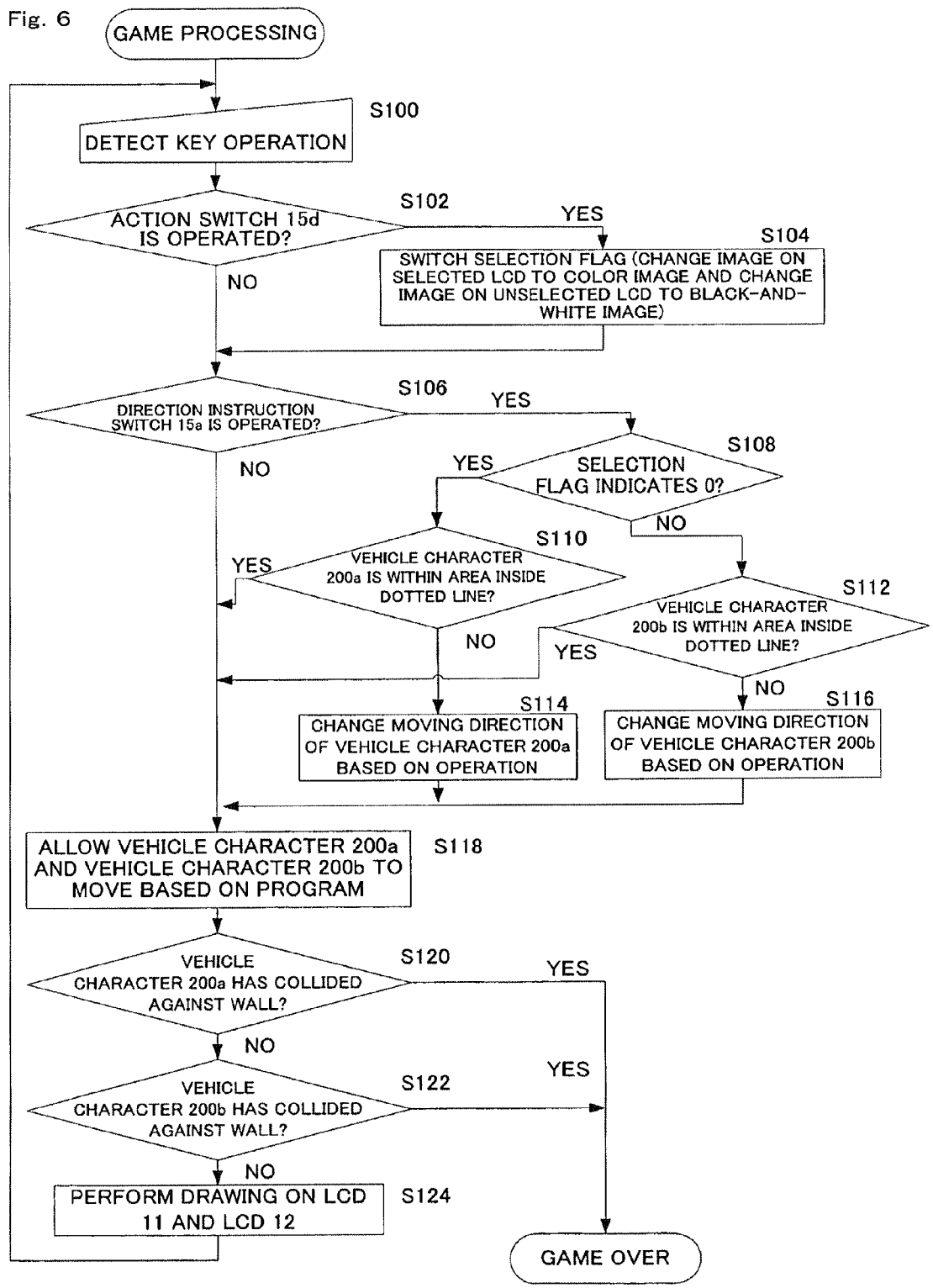
FIG. 6 is a flowchart of the game processing performed by the game apparatus 10 in the first embodiment.

FIG. 6 is a flowchart of a process executed by the game apparatus according to the present embodiment. First, if the power (not shown) of the game apparatus 10 is turned on, a boot program (not shown) is executed by the CPU core 31, and thus the game program stored in the memory card 18 is loaded into the RAM 37. The loaded game program is executed by the CPU core 31, and regarding image processing, an image (an image containing the vehicle character 200a) displayed on the LCD 11 is processed by the first GPU 35, and an image (an image containing the vehicle character 200b) displayed on the LCD 12 is processed by the second GPU 36. Thereby, the following steps are performed. In the present embodiment, the value of the register 41 in FIG. 2 is fixed at 0, the game image generated by the first GPU 35 is output to the LCD 11, and the game image generated by the second GPU 36 is output to the LCD 12.

First, after initialization is performed on the various data and then a game image in an initial state is displayed on each of the LCDs 11 and 12, a process of detecting key operation is performed at step S100. Specifically, an operation of the action switch 15d or the direction instruction switch 15a is detected. After step S100, it is determined at step S102 whether the action switch 15d has been operated, and if it is determined that it has been operated, control proceeds to step S104 and a process of switching the selection between the game images is performed. Specifically, this process is performed as follows: in the case where the selection flag 200 has indicated 0, the selection flag 200 is changed to 1, and in the case where the selection flag 200 has indicated 1, the selection flag 200 is changed to 0. In addition, at step S104, a process of changing the selected image into a color image and displaying the image not selected in black and white is performed.

In the case where it is determined at step S102 that the action switch 15d has not been operated, or in the case where, after S104, control proceeds to step S106, it is determined whether the direction instruction switch 15a has been operated or not; and if it is determined that it has not been operated, control proceeds to step S118. If it is determined that switch 15a has been operated, control proceeds to step S108 and it is determined whether the selection flag 200 indicates 0 or not. If it is determined at step S108 that the selection flag 200 indicates 0 (i.e., if it is determined that the image on the LCD 11 is selected), control proceeds to step S110 and it is determined whether the vehicle character 200a is located within an internal area of the dotted line 202a on the LCD 11. If it is determined that the vehicle character 200a is located within the area, control proceeds to step S118. If it is determined that the vehicle character 200a is not located within the area, control proceeds to step S114, where based on data of operation of the direction instruction switch 15a detected at step S100, the moving direction of the vehicle character 200a is changed (specifically, the value of the vehicle character moving direction vector 203 is changed), thereafter proceeding to step S118.

If it is determined at step S108 that the selection flag 200 does not indicate 0 (i.e., if it is determined that the image on the LCD 12 is being selected), control proceeds to step S112 and it is determined whether the vehicle character 200b is located within an internal area of the dotted line 202b on the LCD 12. If it is determined that it is located within the area, control proceeds to step S118. If it is determined that it is not located within the area, control proceeds to step S116, where based on data of operation of the direction instruction switch 15a detected at step S100, the moving direction of the vehicle character 200b is changed (specifically, the value of the vehicle character moving direction vector 204 is changed), thereafter proceeding to step S118.

At step S118, a process of causing the vehicle character 200a and the vehicle character 200b move forward by a predetermined distance in a current moving direction is performed by the computer control program 190. Specifically, the "vehicle character 200a coordinates" 201 is changed based on the value of the vehicle character moving direction vector 203, and the "vehicle character 200b coordinates" 202 is changed based on the value of the vehicle character moving direction vector 204. After step S118, it is determined at step S120 whether the vehicle character 200a has collided against the wall character 202a. If it is determined that collision has occurred, the game is over (an image of game over is displayed). If it is determined that collision has not occurred, control proceeds to step 5122, and it is determined whether the vehicle character 200b has collided against the wall character 202b. If it is determined that collision has occurred, the game is over (an image of game over is displayed). If it is determined that collision has not occurred, a process of displaying images on the LCD 11 and the LCD 12 is performed at step S124, and then control returns to step S100, repeating the above-described series of processes. At step S124, specifically, a process of the first GPU 35 and the second GPU 36 outputting game images to the LCD controller 40 is performed.

Second Embodiment

FIGS. 7A through 10 are diagrams for describing a second illustrative. First, with reference to FIG. 7A and FIG. 7B, an outline of a game of the second embodiment is described.

Figure 7A:
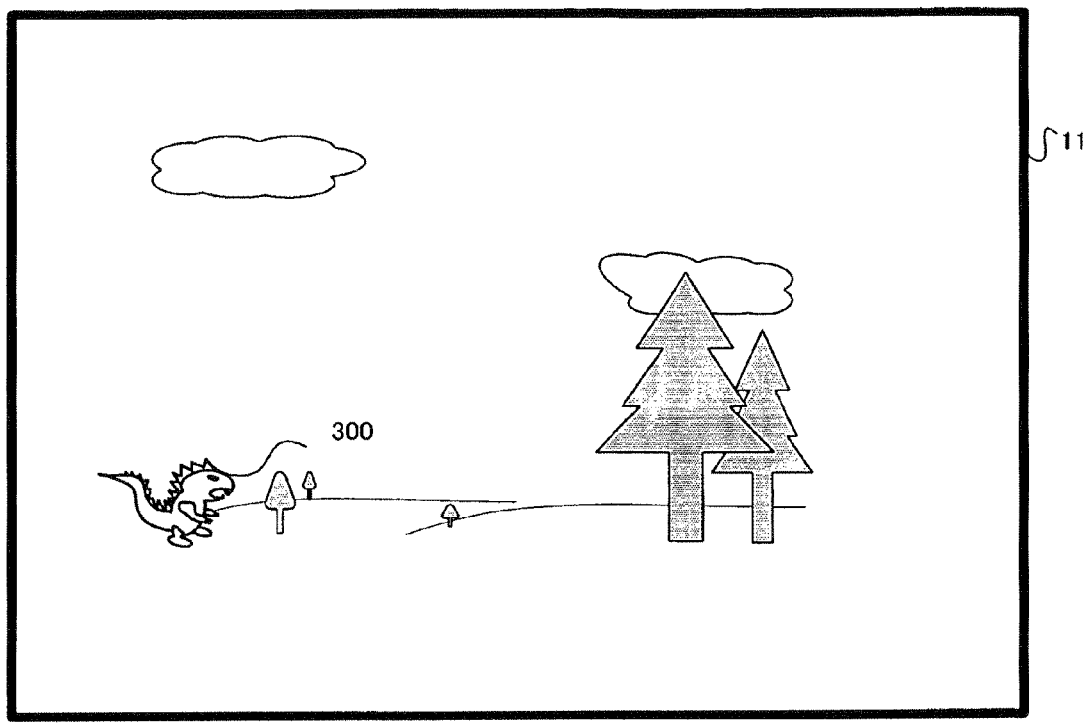
FIG. 7A and FIG. 7B are diagrams each illustrating an exemplary game image on a screen in a second embodiment of the present invention.
Figure 7B:
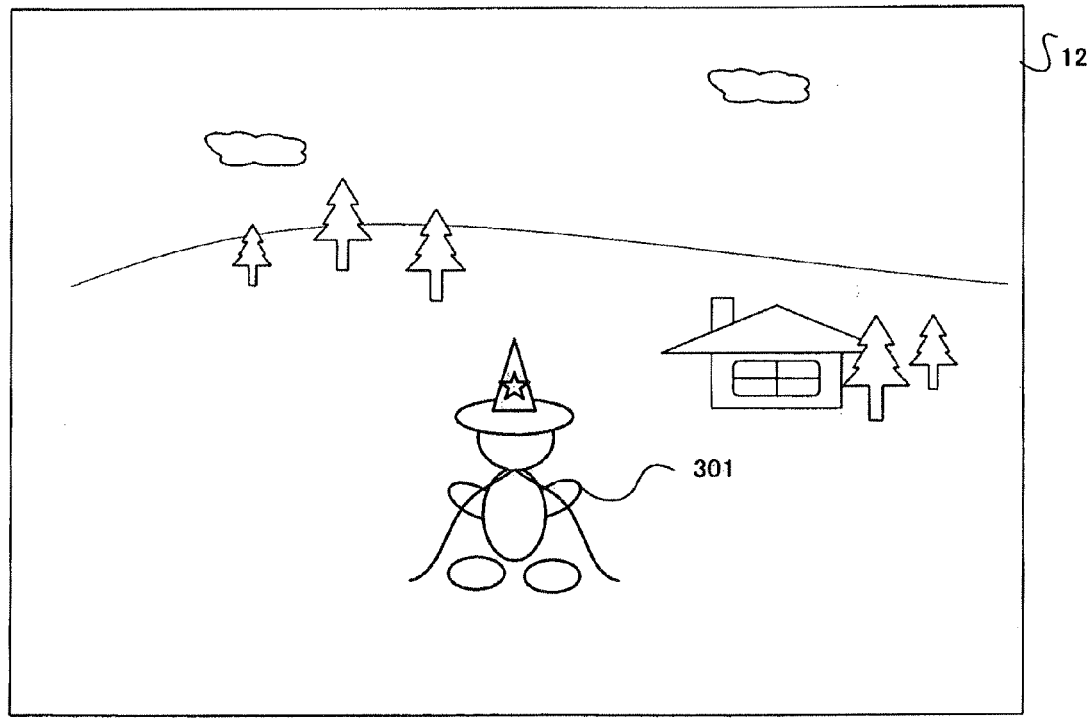

FIG. 7A shows an exemplary game image displayed on the LCD 11, and FIG. 7B shows an exemplary game image displayed on the LCD 12.

In the game of the present embodiment, a player operates two player characters (player characters A and B) in a three-dimensional virtual game space. A subjective viewpoint image, as one might put it, as seen from the player character A's viewpoint is displayed on the LCD 11. At the same time, a subjective viewpoint image, as one might put it, as seen from the player character B's viewpoint is displayed on the LCD 12. In the present embodiment, images of the player characters A and B themselves are not displayed on the LCDs.

A plurality of enemy characters exist in the virtual game space, and each enemy character is caused to act according to a predetermined algorithm based on a game program even while no operation is being made by a player. Specifically, the enemy character moves in the virtual game space and, if it comes within a predetermined distance of the player character, attacks the player character. In FIG. 7A, an enemy character 300, one of the enemy characters, is displayed. It is seen from the game image of FIG. 7A that the enemy character 300 exists ahead on the left, comparatively distant from the player character A. In FIG. 7B, an enemy character 301 is displayed. It is seen from the game image of FIG. 7B that the enemy character 301 exists immediately in front of the player character B.

The player has to operate both the player character A and the player character B so as to run away to avoid attack by the enemy characters. If the player character suffers attack by the enemy character, it suffers damage, resulting in reduction of power. If a power value of either of the player characters becomes 0, the game is over.

As described above, the player has to operate both the player character A and the player character B; however, it is not possible to operate both the player character A and the player character B at the same time. Similarly to the first embodiment, the player selects either one of the image on the LCD 11 or the image on the LCD 12. While the image on the LCD 11 is selected, the operation of the player character A is possible. While the image on the LCD 12 is selected, the operation of the player character B is possible.

The player needs to judge which player character should be operated, viewing the image on the LCD 11 and the image on the LCD 12, switch the selection between the image on the LCD 11 and the image on the LCD 12, and cause the player character to move so as to avoid attack by the enemy character.

Similarly to the first embodiment, an image currently selected is displayed in color, and an image not selected is displayed in black and white. In the examples of FIG. 7A and FIG. 7B, the image on the LCD 11 is selected, and the image on the LCD 12 is not selected and therefore is displayed in black and white.

To describe the movement of the player character specifically, if the direction instruction switch 15a is operated upward, the player character corresponding to the image selected moves ahead (i.e., in the direction in which the player faces) in the virtual game space. If the direction instruction switch 15a is operated downward, the player character moves backward without changing the direction in which the player faces. If the direction instruction switch 15a is operated to the right, the player character turns in a clockwise direction in the virtual game space. If the direction instruction switch 15a is operated to the left, the player character turns in a counter-clockwise direction in the virtual game space.

A virtual game space in which the player character A exists and a virtual game space in which the player character B exists may be a common game space or different game spaces.

Figure 8:
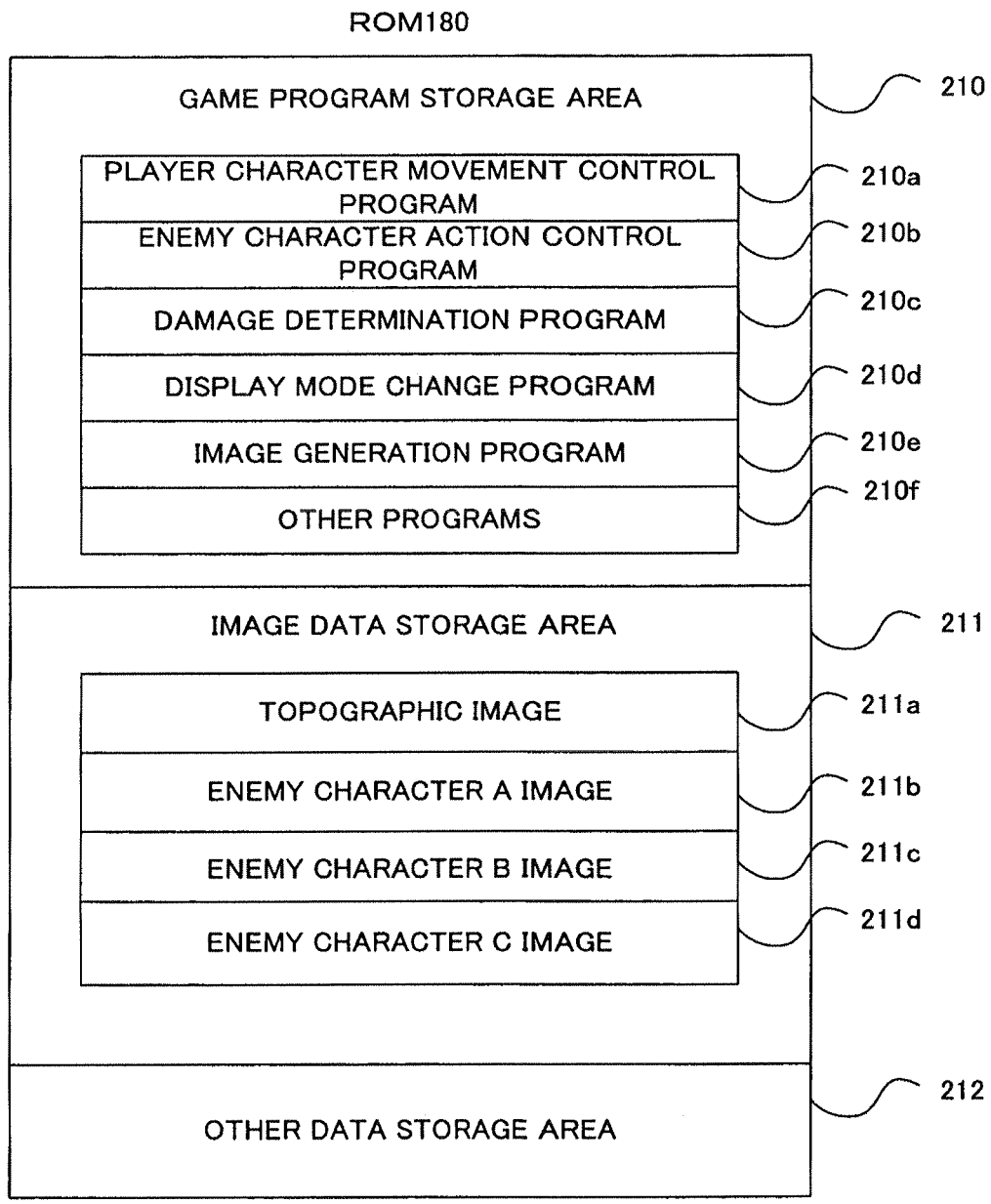
FIG. 8 is an illustrative diagram of programs and data stored in a ROM 180 in the second embodiment.

FIG. 8 shows game programs and data stored in the ROM 180 of the game apparatus 10 according to the present embodiment. When executing the game of the present embodiment, these programs and data are loaded into the RAM 37 and processed by the CPU core 31.

In the ROM 180, a game program storage area 210, an image data storage area 211, and an other data storage area 212 are formed.

In the game program storage area 210, data of various programs executed by the CPU core 31 are stored. Specifically, a player character movement control program 210a, an enemy character action control program 210b, a damage determination program 210c, a display mode change program 210d, an image generation program 210e, and other programs 210f are stored. The player character movement control program 210a is a program for causing the player characters A and B to move, in the virtual game space, based on the operation by the player of the direction instruction switch 15a. The enemy character action control program 210b is a program for causing the enemy character to act according to a predetermined algorithm. The damage determination program 210c is a program for determining that the player character has suffered an attack by the enemy character, calculating the damage from the attack, reducing the power value, and, if the power value becomes 0, performing a game over process. Similarly to the first embodiment, the display mode change program 210d is a program for changing the display mode of the game image displayed, based on whether that image is selected or not. The image generation program 210e is a program for generating an image of the virtual space as seen from the player character's viewpoint. Specifically, it is a program for generating a subjective viewpoint image with a virtual camera set at a location where an eye of the player character is supposed to be located in accordance with the position of the player character in the virtual game space. The other programs 210f are various programs necessary for the game processing, which include a menu program, a program for initial setting, a program for the game over point, a sound program, and the like.

In the image data storage area 211, various image data for displaying the game images are stored. Specifically, topographic image data 211a for showing the topography of the virtual game space, "enemy character A image data" 211b, "enemy character B image data" 211c, "enemy character C image data" 211d, and the like are stored therein. Note that the number of enemy characters may be more than three. In the other data storage area 212, other various data necessary for the game processing is stored, e.g., map data for the virtual game space, data for initial setting, sound data, etc.

Figure 9:
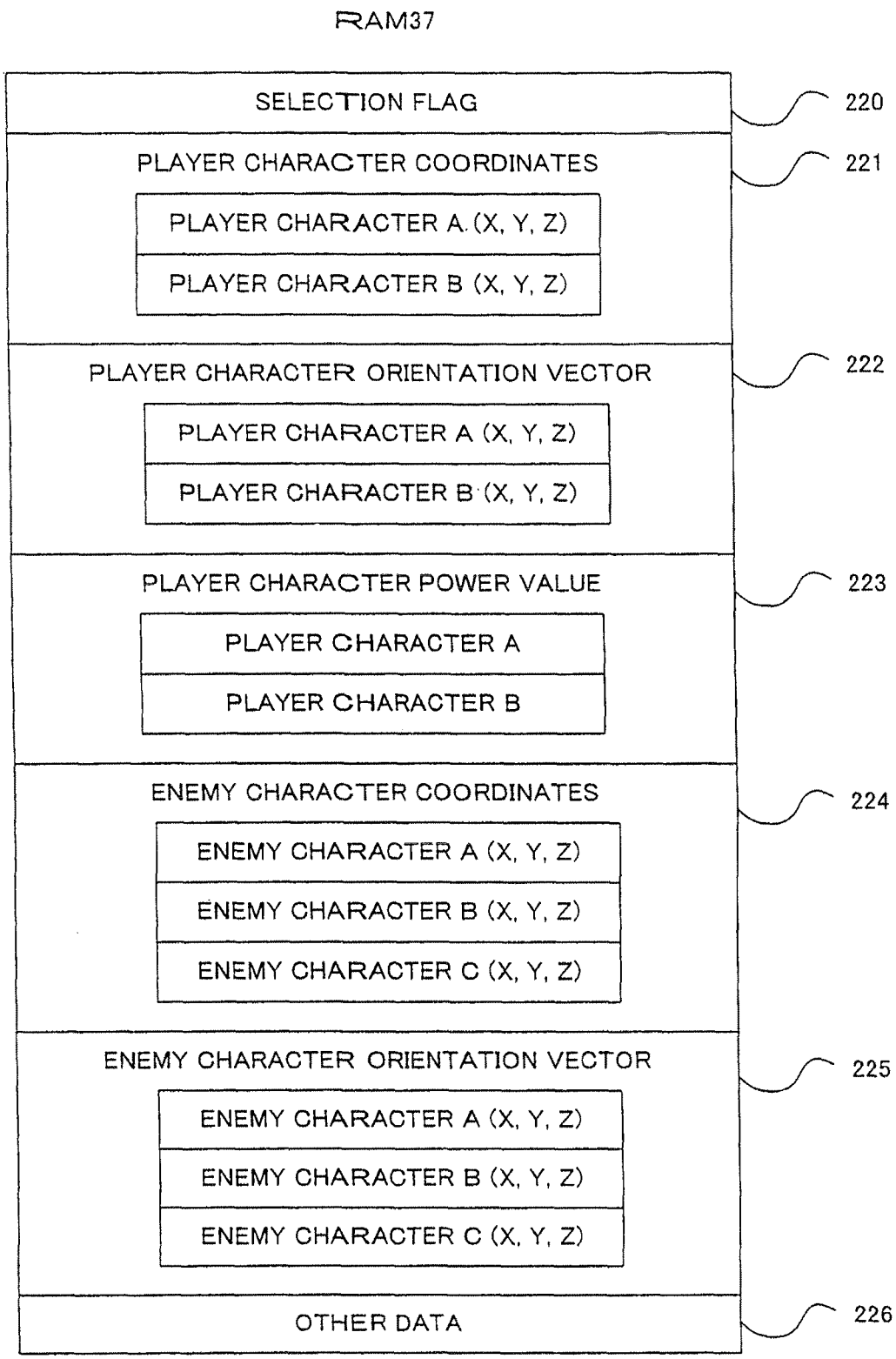
FIG. 9 is an illustrative diagram of data temporarily stored in the RAM 37 while the game processing is being performed in the second embodiment.

FIG. 9 shows data temporarily stored in the RAM 37 while the game of the present embodiment is executed. In the RAM 37, a selection flag 220, player character coordinates 221, a player character orientation vector 222, a player character power value 223, enemy character coordinates 224, an enemy character orientation vector 225, and other data 226 are stored. Regarding the player character coordinates 221, the player character orientation vector 222, and the player character power value 223, data with respect to each of the player character A and the player character B is stored. Regarding the enemy character coordinates 224 and the enemy character orientation vector 225, data with respect to each of the plurality of enemy characters is stored.

As with the first embodiment, the selection flag 200 is data for indicating which of the image on the LCD 11 and the image on the LCD 12 is currently selected. The player character coordinates 221 is a three-dimensional coordinate value indicating a location in the virtual game space of the player character. The player character orientation vector 222 is a three-dimensional vector value indicating a direction in which the player character faces in the virtual game space. The player character power value 223 is a value indicating a power of the player character. Suffering an attack by the enemy character results in reduction of this value, and if it becomes 0, the game is over.

The enemy character coordinates 224 is a three-dimensional coordinate value indicating a location in the virtual game space of the enemy character. The enemy character orientation vector 225 is a three-dimensional vector value indicating a direction in which the enemy character faces.

The player character coordinates 221 and the player character orientation vector 222 are changed by the player character movement control program 210a, and the enemy character coordinates 224 and the enemy character orientation vector 225 are changed by the enemy character action control program 210b. Based on these data, the image generation program 210e generates images of the enemy character and the topography of the virtual game space. As the other data 226, score data and the like are stored as needed.

Note that in addition to these data, the program data as shown in FIG. 8 is read from the ROM 180 and stored in the RAM.

Figure 10:
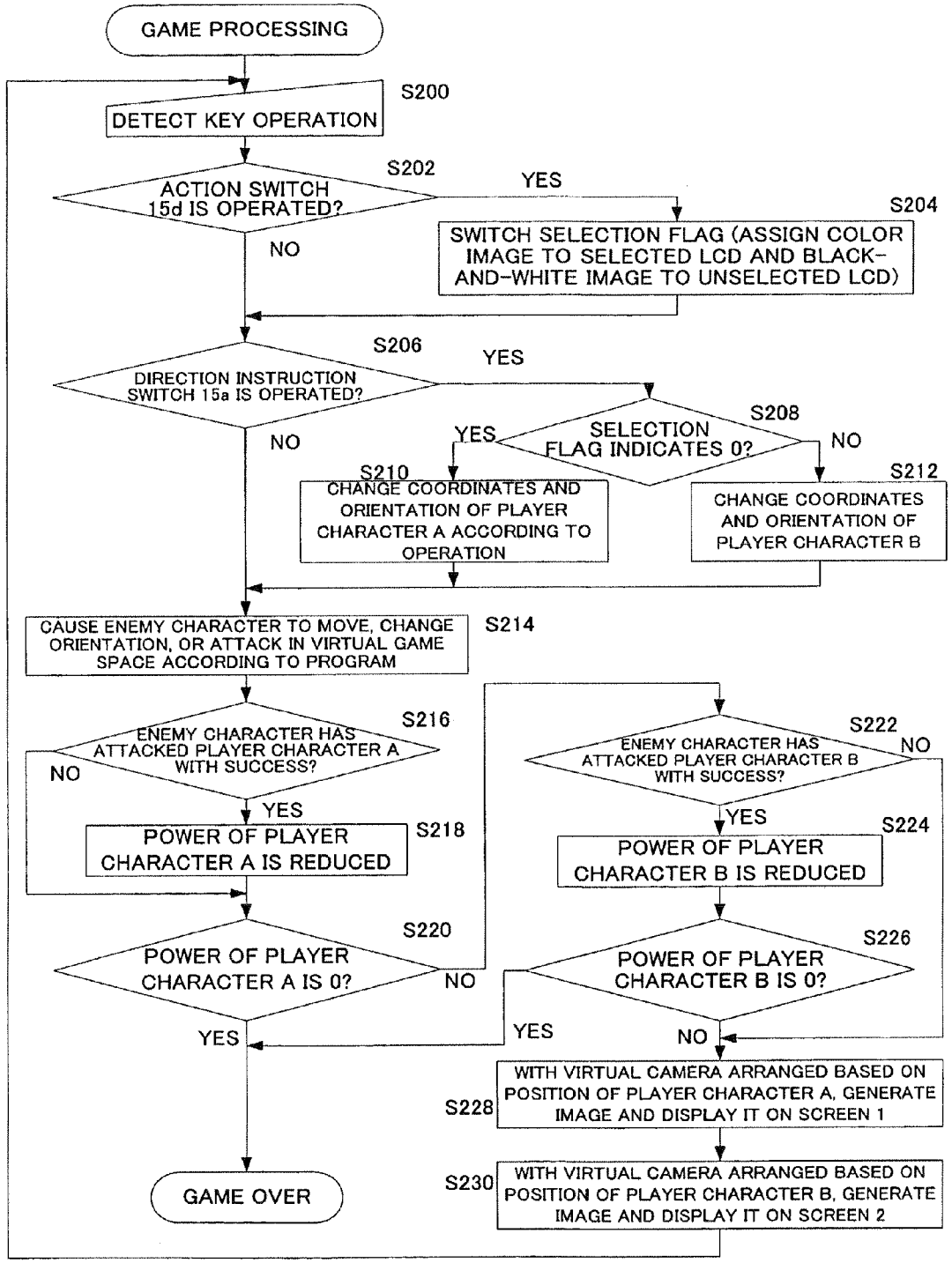
FIG. 10 is a flowchart of the game processing performed by the game apparatus 10 in the second embodiment.

FIG. 10 is a flowchart of a process executed by the game apparatus according to the present embodiment. First, if the power (not shown) of the game apparatus 10 is turned on, a boot program (not shown) is executed by the CPU core 31, and thus the game program stored in the memory card 18 is loaded into the RAM 37. The loaded game program is executed by the CPU core 31, and regarding image processing, an image (an image as seen from the player character A's viewpoint) displayed on the LCD 11 is processed by the first GPU 35, and an image (an image as seen from the player character B's viewpoint) displayed on the LCD 12 is processed by the second GPU 36. Thereby, the following steps are performed. In the present embodiment, the value of the register 41 in FIG. 2 is fixed at 0.

First, initialization is performed on the various data. Specifically, initial locations and orientations of the player characters and the enemy characters are set, and the power values are set. Then, after a game image in an initial state is displayed on each of the LCDs 11 and 12, a process of detecting key operation is performed at step S200. Specifically, an operation of the action switch 15d or the direction instruction switch 15a is detected. After step S200, it is determined at step S202 whether the action switch 15d has been operated, and if it is determined that it has been operated, control proceeds to step S204 and a process of switching the selection between the images is performed. Specifically, this process is performed as follows: in the case where the selection flag has indicated 0, the selection flag 220 is changed to 1, and in the case where the selection flag 220 has indicated 1, the selection flag 220 is changed to 0. In addition, at step S204, a process of changing the selected image into a color image and displaying the image not being selected in black and white is performed.

In the case where it is determined at step S202 that the action switch 15d has not been operated or in the case where, after step S204, control proceeds to step S206, it is determined whether the direction instruction switch 15a has been operated or not; and if it is determined that the switch 15a has not been operated, control proceeds to step S214. If it is determined that the switch 15a has been operated, control proceeds to step S208 and it is determined whether the selection flag 220 indicates 0 or not. If it is determined at step S208 that the selection flag 220 indicates 0, control proceeds to step S210, where the player character A is caused to move in the virtual game space based on the data of the operation of the direction instruction switch 15a detected at S200 (i.e., if the direction instruction switch 15a has been operated upward or downward, the player character coordinates 221 are shifted by a predetermined distance in the direction of the player character orientation vector or in the opposite direction, and if the direction instruction switch 15a is operated to the left or right, the player character orientation vector 222 is changed). Then, control proceeds to step S214.

If it is determined at step S208 that the selection flag 220 does not indicate 0, control proceeds to step S212, where the player character B is caused to move in the virtual game space based on the data of the operation of the direction instruction switch 15a detected at step S200 (i.e., if the direction instruction switch 15a has been operated upward or downward, the player character coordinates 221 are shifted by a predetermined distance in the direction of the player character orientation vector or in the opposite direction, and if the direction instruction switch 15a is operated to the left or right, the player character orientation vector 222 is changed). Then, control proceeds to step S214.

At step S214, a process of causing the enemy characters A, B, and C to act (to move, to change orientation, or to attack the player character) according to a predetermined algorithm is performed with the enemy character action control program 210b. Specifically, for example, a process of changing the enemy character coordinates 224 and the enemy character orientation vector 225 is performed. After step S214, it is determined at step S216 whether any of the enemy characters A, B, and C has attacked the player character A and the attack has been succeeded. If it is determined that an attack has been attempted and has succeeded, control proceeds to step S218, and a process of reducing the power value 223 of the player character A by a predetermined value is performed. Thereafter, control proceeds to step S220, where it is determined whether the power value 223 of the player character A has become 0 or not, and if it has become 0, the game is over. If it is determined that it has not become 0, control proceeds to step 5222, where it is determined whether any of the enemy characters A, B, and C has attacked player character B. If it is determined that an attack has been attempted and has succeeded, control process step S224, where a process of reducing the power value 223 of the player character B by a predetermined value is performed. Thereafter, control proceeds to step S226, where it is determined whether the power value 223 of the player character B has become 0 or not, and if it has become 0, the game is over. If it is determined that it has not become 0, control proceeds to step S228.

At step S228, an image of the virtual game space as seen from the viewpoint of the player character A is generated. That is, based on the player character coordinates 221 and the player character orientation vector 222 of the player character A, a virtual camera is set in the virtual game space, and the image is generated. Specifically, virtual camera coordinates are set at a location, in the virtual space, a predetermined distance away from the player character coordinates in the upward direction (i.e., a location where an eye of the player character is supposed to be present, assuming that the player character coordinates of the player character is set at its feet); an observation point is set at a location a predetermined distance away in the direction of the player character orientation vector; and accordingly the orientation of the virtual camera is set. An angle of view or the like is set as appropriate (for example, the angle of view may be set at a predetermined fixed value). The image generated at step S228 is generated by the first GPU 35 and displayed on the LCD 11.

After step S228, an image of the virtual game space as seen from the viewpoint of the player character B is generated at step S230. That is, a virtual camera for the player character B is set and the image is generated. The process here is similar to that of step S228; therefore, the detailed explanation is omitted. The image generated at step S230 is displayed on the LCD 12.

After step S230, control returns to step S200 and the above-described series of processes are repeated. Although not shown in the drawing, the amount of time that has elapsed since the start of the game (i.e., the amount of time during which the player character has been successful in escaping from the enemy character), the power value of each player character, or the like may be displayed so as to be placed on the game image.

Figure 11:
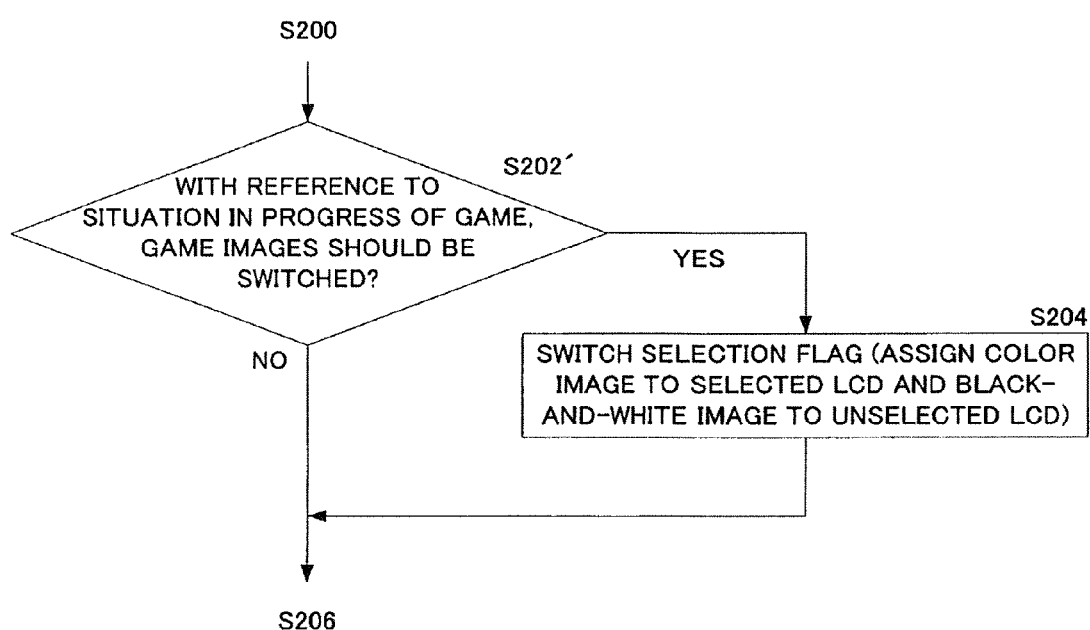
FIG. 11 is a flowchart of the game processing performed by the game apparatus 10 in a variation of the second embodiment.

In the above-described second embodiment, the switching of the selection between the game images is performed based on input from the player; however, it may be automatically switched by the game program: that is, depending on the situation in the progress of the game, the image on the LCD 11 is automatically selected or the image on the LCD 12 is automatically selected. Specifically, data defining situations in the progress of the game as well as data, associated therewith, specifying which of the images should be selected are stored in the ROM 180, and by referring to these data during the execution of the game, the selection between the game images is automatically switched if a predetermined situation is reached. A process performed by the game apparatus 10 in this case is substantially the same as the process described with reference to FIG. 10, the only difference being that step S202 of FIG. 10 is replaced with step S202' in FIG. 11. Specifically, at step S202', the situation in the progress of the game is referred to, and it is determined whether the selection between the game images should be switched. If the situation is such that the switching should be performed, control proceeds to step S204, where a process of switching the selection flag is performed, for example. If the situation is such that the switching should not be performed, control proceeds to step S206. The other processes are similar to the processes described above with reference to FIG. 10; therefore the description thereof is omitted.

Note that, in this example, it may be so arranged that after a game image is automatically selected, the selection thereof can be changed by input from the player.

Figure 12:
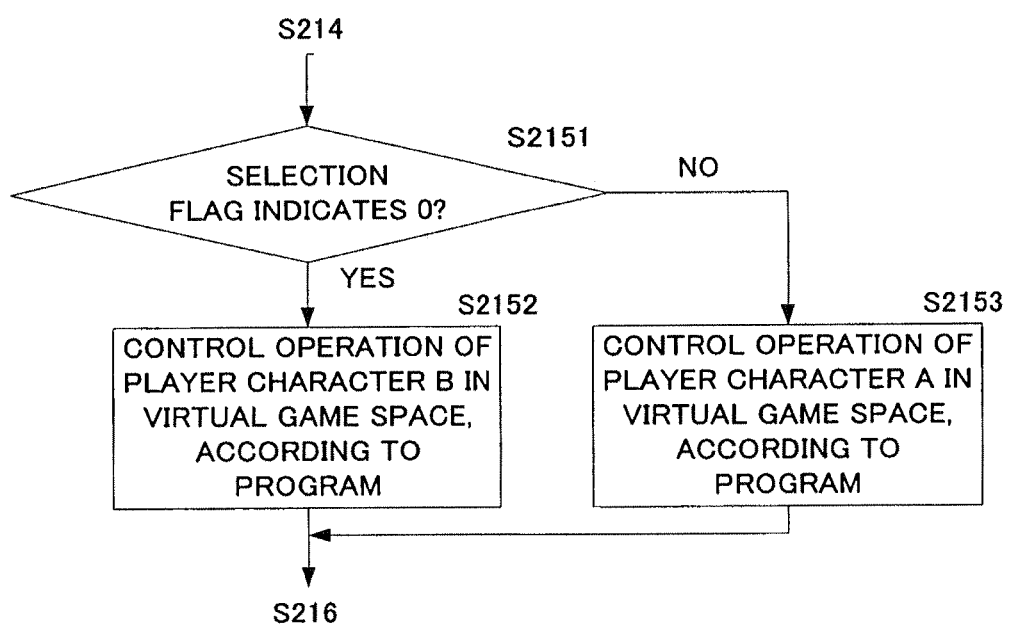
FIG. 12 is a flowchart of the game processing performed by the game apparatus 10 in a further variation of the second embodiment.

In the second embodiment described above, the player character corresponding to the game image not selected does not act at all; however, the player character corresponding to the game image not being selected may be controlled to automatically act according to a predetermined rule. A process performed by the game apparatus 10 in this case is substantially the same as the process described with reference to FIG. 10, the only difference being that a process as shown in FIG. 12 is inserted between step S214 and step S216 of FIG. 10. Specifically, after step S214, it is determined at step S2151 whether the selection flag 220 indicates 0 or not, and if it indicates 0 (i.e., if the game image on the LCD 11 is being selected), control proceeds to step S2152, where a process of automatically controlling the action of the player character B (i.e., the player character corresponding to the game image on the LCD 12 not currently selected) according to a predetermined algorithm defined by the program is performed. If it is determined at step S2151 that the selection flag does not indicate 0 (i.e., the selection flag indicates 1) (i.e., the game image on the LCD 12 is selected), control proceeds to step S2153, where a process of automatically controlling the action of the player character A (i.e., the player character corresponding to the game image on the LCD 11 not currently selected) according to a predetermined algorithm defined by the program is performed. Thus, an unnatural situation, i.e., lack of action of the player character corresponding to the game image not currently selected, can be prevented from occurring. In addition, when the player character is in a comparatively safe condition, for example, it can be left in the unselected status to act automatically; thus, more options are made available to the player, resulting in diversified game progress.

In each of the above-described embodiments, the game image currently selected is rendered in color whereas the game image not selected is rendered in black and white, thereby allowing the player to know which image is currently selected among the two game images. However, it may be so arranged that the game image currently selected is always displayed on the LCD 11 whereas the game image not selected is always displayed on the LCD 12. If the selection is switched, the game image displayed on the LCD 11 and the game image displayed on the LCD 12 are switched. Specifically, the value of the register 41 in FIG. 2 is changed by the CPU core 31 to switch between the game image displayed on the LCD 11 and the game image displayed on the LCD 12. This allows the player to focus mostly on the LCD 11, whereby the screen to be primarily viewed is made fixed, making play easier.

In the description of the above embodiments, it has been assumed that the game executed in the first game image and the game executed in the second game image are the same in game content. However, the game executed in the first game image and the game executed in the second game image may be completely different in game content.

In the first embodiment described above, the evaluation of the game made by the game apparatus with regard to the operation by the player of each player object is performed by determining whether the vehicle character has collided against the wall character or not. In the second embodiment, the above evaluation of the game is performed by determining whether an attack by the enemy character against the player character has succeeded or not. Here, the evaluation of the game made by the game apparatus may be performed in any manner. For example, the evaluation of the game may be performed by adding or subtracting points.

Figure 13:
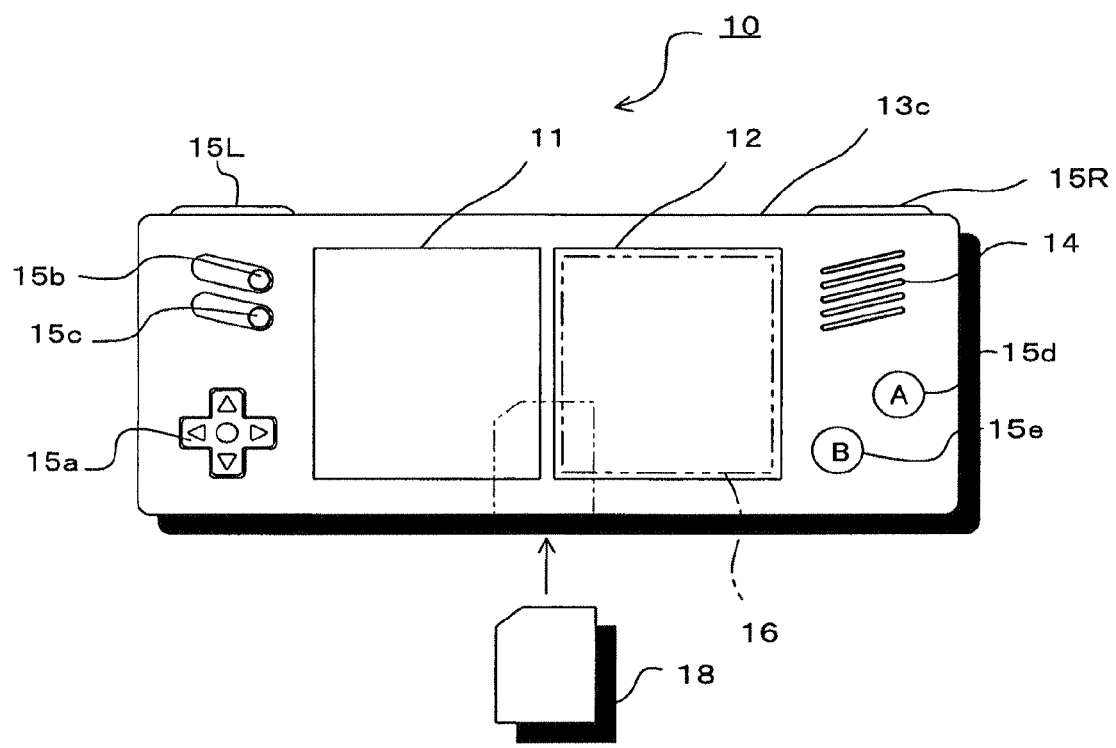
FIG. 13 is a schematic diagram illustrating another configuration of a game apparatus of the illustrative embodiments.

The above embodiments have illustrated an exemplary case where two physically separated LCDs 11 and 12 are disposed one above the other (i.e., the case of two screens, upper and lower) as an example of liquid crystal display sections embodying two screens; however, as shown in FIG. 13, with the upper housing 13a being omitted, one housing 13c may be formed to have a wide rectangular shape so that the LCD 11 and the LCD 12 embodying two screens will be accommodated therein so as to be arranged side by side. In this case, in view of the fact that the user is more likely to be right-handed, it is preferred that the LCD 12 having the touch panel 16 mounted thereon is located on the right side whereas the LCD 11 is located on the left side. However, they are arranged the other way around if a hand-held game apparatus for a left-handed user is to be produced.

Figure 14:
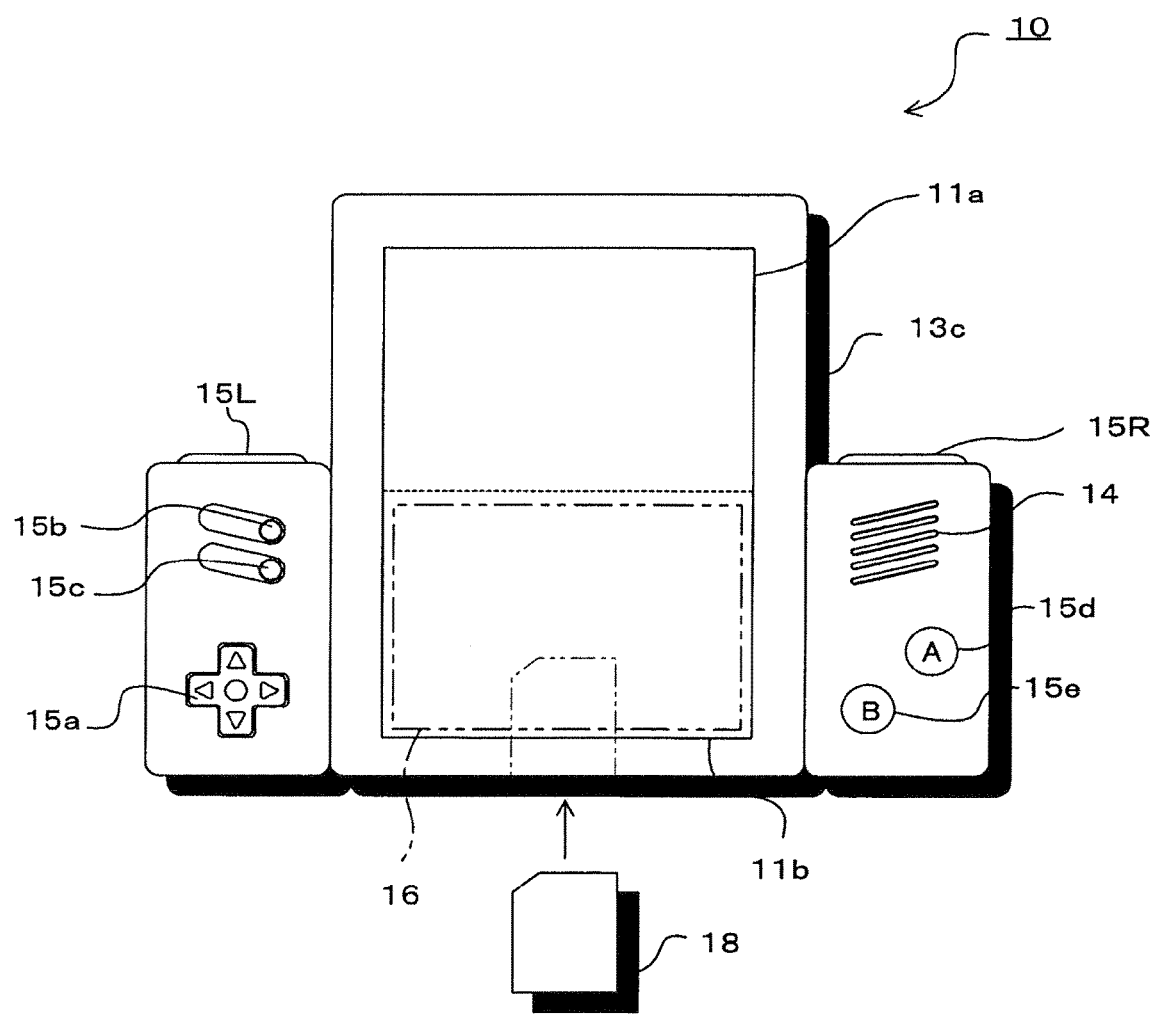
FIG. 14 is a schematic diagram illustrating another configuration of a game apparatus of the illustrative embodiments.
Figure 15:
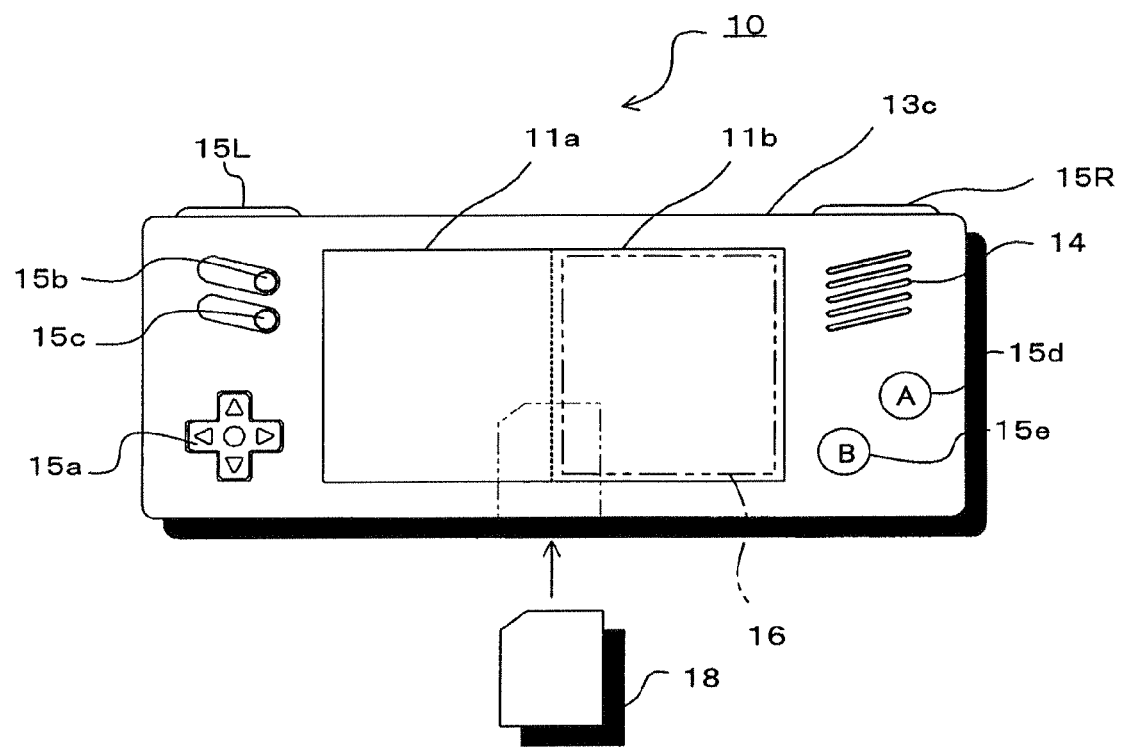
FIG. 15 is a schematic diagram illustrating another configuration of a game apparatus of the illustrative embodiments.

As another possible arrangement, instead of providing the two physically separated LCDs 11 and 12 arranged one above the other, as shown in FIG. 14, an LCD having a vertically long shape with the same horizontal dimension and a vertical dimension twice as long (i.e., an LCD which is physically a single entity but provides a display size which can implement two screens vertically arranged) may be employed to provide a liquid crystal display section embodying two screens vertically arranged to allow game images for two screens to be displayed one above the other (i.e., to allow them to be displayed vertically adjacent to each other in a seamless fashion). Also, as shown in FIG. 15, an LCD having a horizontally long shape with the same vertical dimension and a horizontal dimension twice as long may be employed to allow map images for two screens to be displayed side by side horizontally (i.e., to allow them to be displayed horizontally adjacent to each other in a seamless fashion). That is, in the examples of FIG. 14 and FIG. 15, a screen which is physically a single entity but split into two is used to display a plurality of game images.

The above embodiments have described the case where the game apparatus according to the illustrative embodiments is a hand-held game apparatus; however, the game apparatus may be a non-handheld type game apparatus. For example, game images for two screens may be displayed on a monitor (e.g., a television) connected to a non-handheld type game apparatus. Further, the controller used by the player as an operation means in the non-handheld type game apparatus may be single or multiple in number. In other words, a character associated with the first game image and a character associated with the second game image may be operated by a common controller or separate controllers.

As described above, the illustrative embodiments are usable to achieve a feature, for example, of providing a game apparatus and game program allowing a game to progress while two concurrently displayed game images are switched therebetween.

While the invention has been described in detail, the foregoing description is in all aspects illustrative and not restrictive. It is understood that numerous other modifications and variations can be devised without departing from the scope of the invention.

What is claimed is:

1. A game apparatus capable of displaying a first game image and a second game image, different from the first game image, comprising:
   a selection programmed logic circuitry which selects either the first game image or the second game image in accordance with a selection operation by a user;
   a first action controller which, when the first game image is selected by the selection programmed logic circuitry, controls an action of a first player object associated with the first game image in accordance with an operation by the user;
   a second action controller which, when the second game image is selected by the selection programmed logic circuitry, controls an action of a second player object, different from the first player object, associated with the second game image in accordance with the operation by the user;
   an evaluation programmed logic circuitry which evaluates both a result of the action of the first player object caused by the first action controller and a result of the action of the second player object caused by the second action controller;
   a first display controller which generates and displays, as the first game image, an image including at least the first player object or an image of a virtual space as seen from a viewpoint of the first player object; and
   a second display controller which generates and displays, as the second game image, an image including at least the second player object or an image of a virtual space as seen from a viewpoint of the second player object, wherein the selection programmed logic circuitry prevents a simultaneous operation of the first action controller and the second action controller.

2. The game apparatus according to claim 1, wherein the selection programmed logic circuitry automatically selects either the first game image or the second game image in accordance with a game situation.

3. The game apparatus according to claim 1, wherein the first action controller and the second action controller share an operation device to control the action of the first player object and the action of the second player object, respectively.

4. The game apparatus according to claim 1, further comprising:
   a first automatic controller which, regardless of selection by the selection programmed logic circuitry, controls the action of the first player object and the action of the second player object based on a predetermined rule, in addition to control thereof by the first action controller and the second action controller,
   wherein the evaluation programmed logic circuitry evaluates both a result of the action of the first player object caused by the first action controller and the first automatic controller and a result of the action of the second player object caused by the second action controller and the first automatic controller.

5. The game apparatus according to claim 1, further comprising:
   a third action controller which, regardless of selection by the selection programmed logic circuitry, controls an action of a non-player object based on a predetermined rule; and
   a condition change programmed logic circuitry which changes conditions of the first player object, or the second player object, or both, in accordance with the action of the non-player object caused by the third action controller,
   wherein the evaluation programmed logic circuitry evaluates both the condition of the first player object and the condition of the second player object changed by the condition change programmed logic circuitry.

6. The game apparatus according to claim 1, wherein when a predetermined condition is satisfied, the first action controller is allowed to control the action of the first player object in accordance with the operation by the user.

7. The game apparatus according to claim 6, wherein the first game image shows the user whether the predetermined condition is satisfied.

8. The game apparatus according to claim 1, further comprising a selection switch, wherein if an operation is performed on the selection switch, the selection programmed logic circuitry switches selection between the first game image and the second game image.

9. The game apparatus according to claim 1, further comprising a display mode change programmed logic circuitry which changes display modes of the first game image and the second game image depending on the presence or absence of selection by the selection programmed logic circuitry.

10. The game apparatus according to claim 1, further comprising a first display section and a second display section, wherein an image selected by the selection programmed logic circuitry is displayed on the first display section whereas an unselected image is displayed on the second display section.

11. The game apparatus according to claim 1, further comprising an automatic controller which controls, according to a predetermined rule, the action of the first player object associated with the first game image or the second player object associated with the second image which ever is not selected by the selection programmed logic circuitry.

12. The game apparatus according to claim 1, wherein a game content associated with the first game image is different from a game content associated with the second game image.

13. A method of operating a game apparatus, the method comprising:
   displaying first and second images, the first image being related to a first game instance and being displayed on one of the first and second displays of the game apparatus, and the second image being related to a second game instance and being displayed on the other of the first and second displays;
   mutually exclusively selecting either the first game instance or the second game instance to receive a user input;
   controlling an action of a first player object associated with the first game instance based on the user input received through a first input device of the game apparatus when the first game instance is selected;
   controlling an action of a second player object associated with the second game instance based on the user input received through a second input device of the game apparatus when the second game instance is selected;
   evaluating first and second results, the first result being a result due to the action of the first player object, and the second result being a result due to the action of the second player object; and
   generating the first and second images based respectively on the first and second results.

14. The method according to claim 13, wherein the step of evaluating the first and second results comprises evaluating that there is a failure in a combination of the first and second game instances when there is a failure in either the first game instance or the second game instance.

15. The method according to claim 14, wherein other than the failure in either the first or the second game instance, actions taken in the first game instance do not affect a situation in the second game instance and actions taken in the second game instance do not affect a situation in the first game instance.

16. The method according to claim 13, wherein a game content of the first game instance is different from a game content of the second game instance.

17. The method according to claim 13, wherein the step of generating the first and second images comprises:
   generating one or both of the first image based on the first result and the second image based on the second result,
   wherein the first image is an image that includes at least the first player object or is an image of a first virtual space as seen from a perspective of the first player object, and
   wherein the second image is an image that includes at least the second player object or is an image of a second virtual space as seen from a perspective of the second player object.

18. The method according to claim 13, further comprising displaying one or both of first and second visual cues,
   wherein the first visual cue informs the user whether or not the first game instance is selected to receive the user input, and
   wherein the second visual cue informs the user whether or not the second game instance is selected to receive the user input.

19. The method according to claim 13, further comprising:
   controlling, regardless of whether the first or the second game instance is selected, an action of one or more non-player objects in one or both of the first and second game instances based on a predetermined rule; and changing conditions of one or both the first player object and the second player object in accordance with the actions of the one or more non-player objects, wherein in the step of evaluating the first and second results, the first result is also based on the changed condition of the first player object, and the second result is also based on the changed condition of the second player object.

20. The method according to claim 13, further comprising one or both of:

when the first game instance is selected, prohibiting the first game instance from receiving the user input through the first input device when a situation of the first game instance meets a first predetermined criteria; and when the second game instance is selected, prohibiting the second game instance from receiving the user input through the second input device when a situation of the second game instance meets a second predetermined criteria.

21. The method according to claim 13, wherein the step of displaying the first and second images comprises:

when the first game instance is selected, displaying the first image on the first display, and displaying the second image on the second display; and when the second game instance is selected, displaying the second image on the first display, and displaying the first image on the second display.

22. A non-transitory computer-readable storage medium having stored therein a game program to be executed by a computer of a game apparatus capable of displaying a first game image and a second game image, different from the first game image, the game program causing the game apparatus to function as:

a selection programmed logic circuitry which selects either the first game image or the second game image in accordance with a selection operation by a user;

a first action controller which, when the first game image is selected by the selection programmed logic circuitry, controls an action of a first player object associated with the first game image in accordance with an operation by the user;

a second action controller which, when the second game image is selected by the selection programmed logic circuitry, controls an action of a second player object, different from the first player object, associated with the second game image in accordance with the operation by the user;

an evaluation programmed logic circuitry which evaluates both a result of the action of the first player object caused by the first action controller and a result of the action of the second player object caused by the second action controller;

a first display controller which generates and displays, as the first game image, an image including at least the first player object or an image of a virtual space as seen from a viewpoint of the first player object; and a second display controller which generates and displays, as the second game image, an image including at least the second player object or an image of a virtual space as seen from a viewpoint of the second player object, wherein the selection programmed logic circuitry prevents a simultaneous operation of the first action controller and the second action controller.

23. The non-transitory computer-readable storage medium according to claim 22, wherein a game content associated with the first game image is different from a game content associated with the second game image.

* * * * *